(12) United States Patent
Park et al.

(10) Patent No.: US 10,205,570 B2
(45) Date of Patent: Feb. 12, 2019

(54) METHOD AND APPARATUS FOR CONFIGURING PILOT SEQUENCE IN WLAN SYSTEM

(71) Applicant: LG ELECTRONICS INC., Seoul (KR)

(72) Inventors: Eunsung Park, Seoul (KR); Jinsoo Choi, Seoul (KR); Hangyu Cho, Seoul (KR)

(73) Assignee: LG ELECTRONICS INC., Seoul (KR)

(*) Notice: Subject to any disclaimer, the term of this patent is extended or adjusted under 35 U.S.C. 154(b) by 73 days.

(21) Appl. No.: 15/365,828

(22) Filed: Nov. 30, 2016

(65) Prior Publication Data

US 2017/0156148 A1    Jun. 1, 2017

Related U.S. Application Data

(60) Provisional application No. 62/260,643, filed on Nov. 30, 2015, provisional application No. 62/266,695, filed on Dec. 13, 2015, provisional application No. 62/290,459, filed on Feb. 3, 2016.

(51) Int. Cl.
| | | |
|---|---|---|
| *H04W 72/04* | (2009.01) | |
| *H04L 5/00* | (2006.01) | |
| *H04W 84/12* | (2009.01) | |

(52) U.S. Cl.
CPC ....... *H04L 5/0048* (2013.01); *H04W 72/0453* (2013.01); *H04L 5/0007* (2013.01); *H04L 5/0053* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 6,463,298 B1* | 10/2002 | Sorenson | .......... | H04W 36/0083 455/552.1 |
| 7,778,357 B2* | 8/2010 | Alcouffe | ............. | H04L 25/0202 375/260 |
| 2005/0185605 A1* | 8/2005 | Cho | ....................... | H04L 5/0021 370/320 |
| 2006/0251183 A1* | 11/2006 | Soffer | ...................... | H04B 7/10 375/267 |
| 2016/0165574 A1* | 6/2016 | Chu | ...................... | H04L 5/0007 370/312 |
| 2016/0330000 A1* | 11/2016 | Lee | ........................ | H04L 5/0007 |
| 2017/0171860 A1* | 6/2017 | Park | ................... | H04W 72/0453 |
| 2018/0138959 A1* | 5/2018 | Chun | ................... | H04B 7/0626 |
| 2018/0184408 A1* | 6/2018 | Xue | ..................... | H04L 27/2613 |

FOREIGN PATENT DOCUMENTS

EP    3133762 A1 *  2/2017   ........... H04L 1/0026

* cited by examiner

*Primary Examiner* — Noel R Beharry
*Assistant Examiner* — Rodrick Mak
(74) *Attorney, Agent, or Firm* — Lee Hong Degeran Kang & Waimey

(57) ABSTRACT

Provided are a method and apparatus for transmitting a feedback frame in a WLAN system. More specifically, a transmission apparatus configures the pilot sequence of a first WLAN system using the pilot sequence of a second WLAN system. The transmission apparatus transmits the pilot sequence of the first WLAN system.

16 Claims, 17 Drawing Sheets

FIG. 1
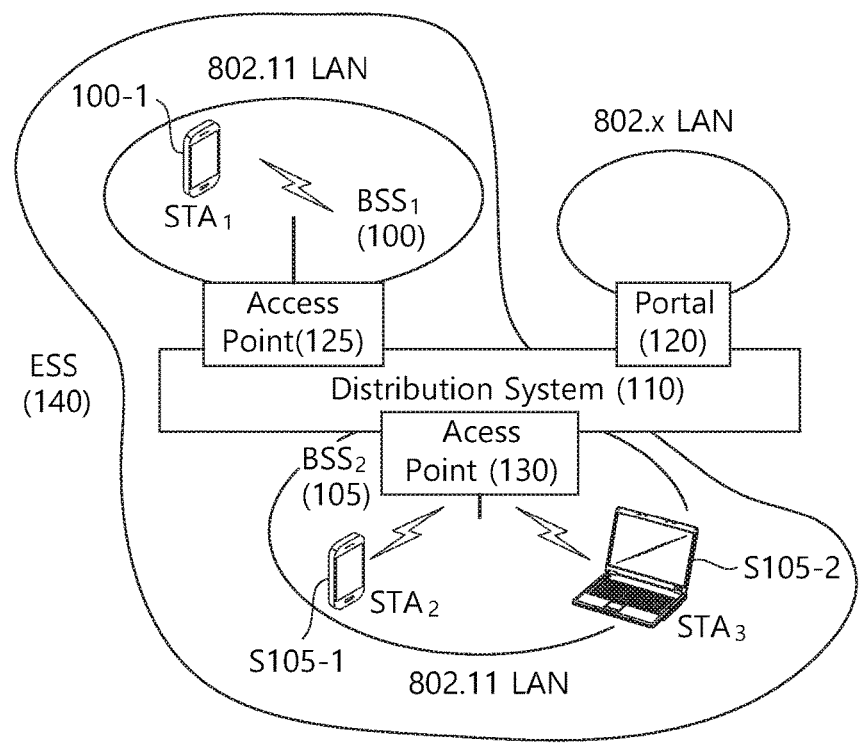
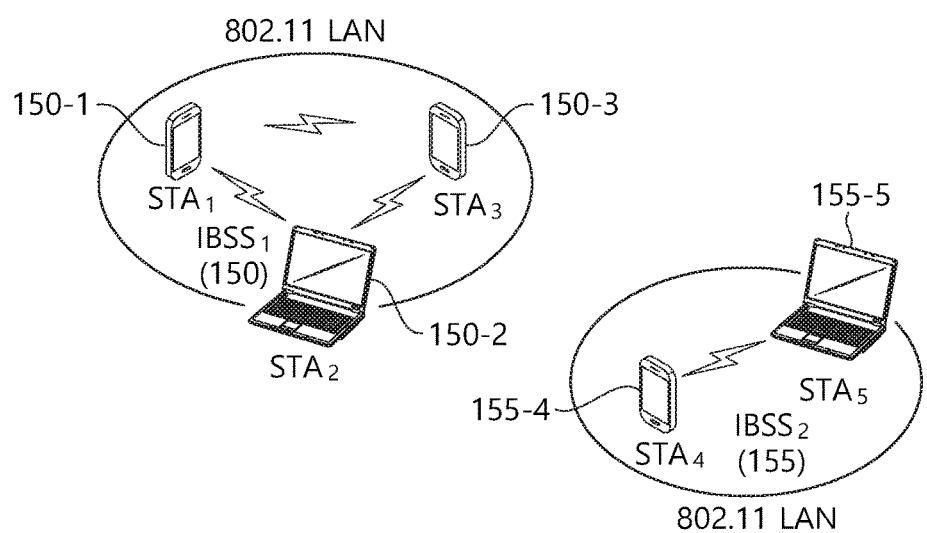

METHOD AND APPARATUS FOR CONFIGURING PILOT SEQUENCE IN WLAN SYSTEM

CROSS-REFERENCE TO RELATED APPLICATION

Pursuant to 35 U.S.C. § 119(e), this application claims the benefit of U.S. Provisional Application Nos. 62/260,643 filed on Nov. 30, 2015, 62/266,695 filed on Dec. 13, 2015, and 62/290,459 filed on Feb. 3, 2016, the contents of which are all hereby incorporated by reference herein in their entirety.

BACKGROUND OF THE INVENTION

Field of the Invention

The present invention relates to wireless communication and, more particularly, to a method for configuring a pilot sequence in a WLAN system and an apparatus using the same.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

The present invention provides a method for configuring a pilot sequence in a WLAN system and an apparatus using the same.

This specification proposes a method for configuring a pilot sequence in a WLAN system.

Furthermore, there is proposed a method for performing communication in a first WLAN system supporting a plurality of frequency resource units corresponding to different frequency bands.

First, terms are defined below. The first WLAN system may correspond to an 802.11ax system. A second WLAN system may correspond to an 802.11ac or 802.11ah system. The different frequency bands may correspond to 20 MHz, 40 MHz, 80 MHz, etc. The plurality of frequency resource units corresponding to the different frequency bands may correspond to a 26-RU, a 52-RU, a 106-RU, a 242-RU, a 484-RU and/or a 996-RU. The 26-RU is a frequency RU including 26 subcarriers. The 52-RU is a frequency RU including 52 subcarriers. The 106-RU is a frequency RU including 106 subcarriers. The 242-RU is a frequency RU including 242 subcarriers. The 484-RU is a frequency RU including 484 subcarriers. The 996-RU is a frequency RU including 996 subcarriers.

First, a transmission apparatus configures the pilot sequence of the first WLAN system using the pilot sequence of the second WLAN system. In this case, the pilot sequence of the second WLAN system may be the pilot sequence {1 −1} of an existing 802.11ah system.

The transmission apparatus transmits the pilot sequence of the first WLAN system.

The pilot sequence of the first WLAN system indicates information about a pilot coefficient corresponding to a predetermined frequency band. Furthermore, the pilot sequence of the first WLAN system is determined with respect to the 52-RU, 106-RU, 242-RU, 484-RU, and 996-RU on the basis of the 26-RU. Furthermore, the pilot sequence of the first WLAN system is identically set for each frequency RU having the same size.

That is, in the method, the pilot sequence is configured by extending the 26-RU to another RU based on the 26-RU by reusing a 1 MHz pilot coefficient of the existing 802.11ah system. In this case, the existing method is reused only in the 26-RU, but the same pilot sequence may be guaranteed in an RU having the same size. That is, the same pilot sequence may be configured for each RU with respect to the same RU.

For example, if the predetermined frequency band is 20 MHz, the pilot sequence of the first WLAN system may be set as {1 −1} in the 26-RU, may be set as {1 −1 1 −1} in the 52-RU, may be set as {1 1 −1 −1} in the 106-RU, and may be set as {1 1 −1 −1 1 1 −1 −1} in the 242-RU.

For another example, if the predetermined frequency band is 40 MHz, the pilot sequence of the first WLAN system may be set as {1 −1} in the 26-RU, may be set as {1 −1 1 −1} in the 52-RU, may be set as {1 1 −1 −1} in the 106-RU, may be set as {1 1 −1 −1 1 1 −1 −1} in the 242-RU, and may be set as {1 1 −1 −1 1 1 −1 −1 1 1 −1 −1 1 1 −1 −1} in the 484-RU.

For yet another example, if the predetermined frequency band is 80 MHz, the pilot sequence of the first WLAN system may be set as {1 −1} in the 26-RU, may be set as {1 −1 1 −1} in the 52-RU, may be set as {1 1 −1 −1} in the 106-RU, may be set as {1 1 −1 −1 1 1 −1 −1} in the 242-RU, may be set as {1 1 −1 −1 1 1 −1 −1 1 1 −1 −1 1 1 −1 −1} in the 484-RU, and may be set as {1 1 1 1 1 1 1 1 1 1 1 1 1 1 1 1} in the 996-RU.

The pilot sequence is not limited to the aforementioned examples and may be set in various manners according to embodiments. The first WLAN system supports a plurality of frequency resource units corresponding to different frequency bands. Accordingly, the pilot sequence may be set in each RU by configuring all of RUs which may be combined within the predetermined frequency band.

Furthermore, this specification proposes an apparatus for configuring a pilot sequence in a WLAN system. The apparatus may correspond to an AP or a beamformer, but is not limited thereto.

Furthermore, there is proposed a transmission apparatus for performing communication in a first WLAN system supporting a plurality of frequency resource units corresponding to different frequency bands.

First, terms are defined below. The first WLAN system may correspond to an 802.11ax system. A second WLAN system may correspond to an 802.11ac or 802.11ah system. The different frequency bands may correspond to 20 MHz, 40 MHz, 80 MHz, etc. The plurality of frequency resource units corresponding to the different frequency bands may correspond to a 26-RU, a 52-RU, a 106-RU, a 242-RU, a 484-RU and/or a 996-RU. The 26-RU is a frequency RU including 26 subcarriers. The 52-RU is a frequency RU including 52 subcarriers. The 106-RU is a frequency RU including 106 subcarriers. The 242-RU is a frequency RU including 242 subcarriers. The 484-RU is a frequency RU including 484 subcarriers. The 996-RU is a frequency RU including 996 subcarriers.

The apparatus includes a radio frequency (RF) unit transmitting and receiving a radio signal and a processor operatively connected to the RF unit.

The processor first the pilot sequence of the first WLAN system using the pilot sequence of the second WLAN system. In this case, the pilot sequence of the second WLAN system may be the pilot sequence {1 −1} of an existing 802.11ah system.

The processor transmits the pilot sequence of the first WLAN system.

The pilot sequence of the first WLAN system indicates information about a pilot coefficient corresponding to a predetermined frequency band. Furthermore, the pilot sequence of the first WLAN system is determined with respect to the 52-RU, 106-RU, 242-RU, 484-RU, and 996-RU on the basis of the 26-RU. Furthermore, the pilot sequence of the first WLAN system is identically set for each frequency RU having the same size.

That is, the apparatus configures the pilot sequence by extending the 26-RU to another RU based on the 26-RU by reusing a 1 MHz pilot coefficient of the existing 802.11ah system. In this case, the existing method is reused only in the 26-RU, but the same pilot sequence may be guaranteed in an RU having the same size. That is, the same pilot sequence may be configured for each RU with respect to the same RU.

For example, if the predetermined frequency band is 20 MHz, the pilot sequence of the first WLAN system may be set as {1 −1} in the 26-RU, may be set as {1 −1 1 −1} in the 52-RU, may be set as {1 1 −1 −1} in the 106-RU, and may be set as {1 1 −1 −1 1 1 −1 −1} in the 242-RU.

For another example, if the predetermined frequency band is 40 MHz, the pilot sequence of the first WLAN system may be set as {1 −1} in the 26-RU, may be set as {1 −1 1 −1} in the 52-RU, may be set as {1 1 −1 −1} in the 106-RU, may be set as {1 1 −1 −1 1 1 −1 −1} in the 242-RU, and may be set as {1 1 −1 −1 1 1 −1 −1 1 1 −1 −1 1 1 −1 −1} in the 484-RU.

For yet another example, if the predetermined frequency band is 80 MHz, the pilot sequence of the first WLAN system may be set as {1 −1} in the 26-RU, may be set as {1 −1 1 −1} in the 52-RU, may be set as {1 1 −1 −1} in the 106-RU, may be set as {1 1 −1 −1 1 1 −1 −1} in the 242-RU, may be set as {1 1 −1 −1 1 1 −1 −1 1 1 −1 −1 1 1 −1 −1} in the 484-RU, and may be set as {1 −1 1 −1 1 −1 1 −1 1 −1 1 −1 1 −1 1 −1} in the 996-RU.

The pilot sequence is not limited to the aforementioned examples and may be set in various manners according to embodiments. The first WLAN system supports a plurality of frequency resource units corresponding to different frequency bands. Accordingly, the pilot sequence may be set in each RU by configuring all of RUs which may be combined within the predetermined frequency band.

This specification proposes a pilot sequence configured from a viewpoint of a unified structure not a PAPR viewpoint using a unified pilot position based on the pilot position of an 26-RU regardless of the size of an RU in the 802.11ax system. Accordingly, a more efficient pilot sequence can be configured in the 802.11ax system.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

Figure 2:
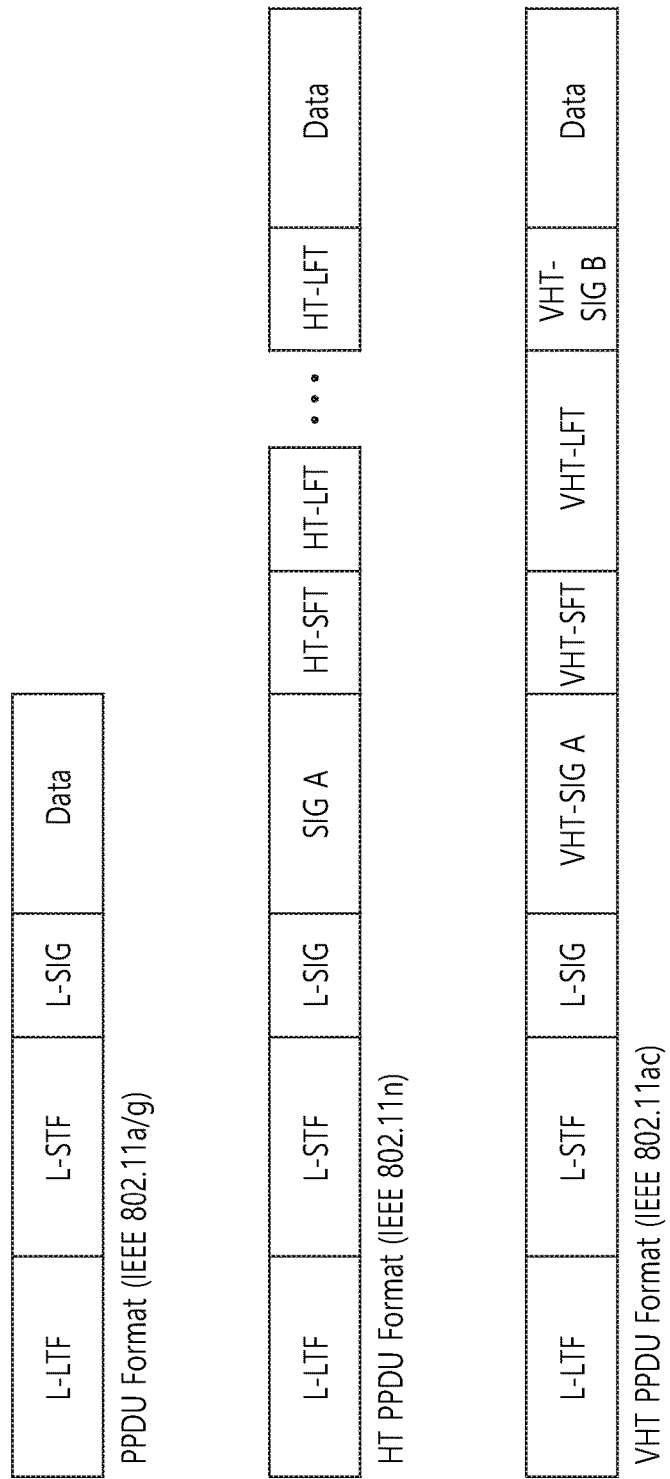
FIG. 2 is a diagram illustrating an example of a PPDU used in an IEEE standard.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring to the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Meanwhile, the term user may be used in diverse meanings, for example, in wireless LAN communication, this term may be used to signify a STA participating in uplink MU MIMO and/or uplink OFDMA transmission. However, the meaning of this term will not be limited only to this.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

More detailed description of the respective fields of FIG. 3 will be made below.

Figure 4:
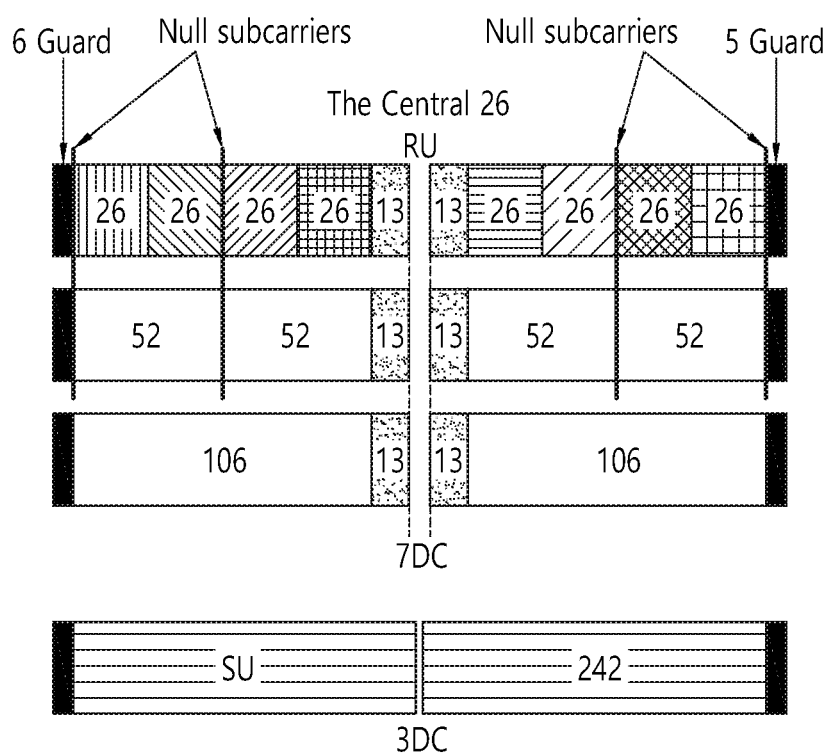
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated with respect to the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
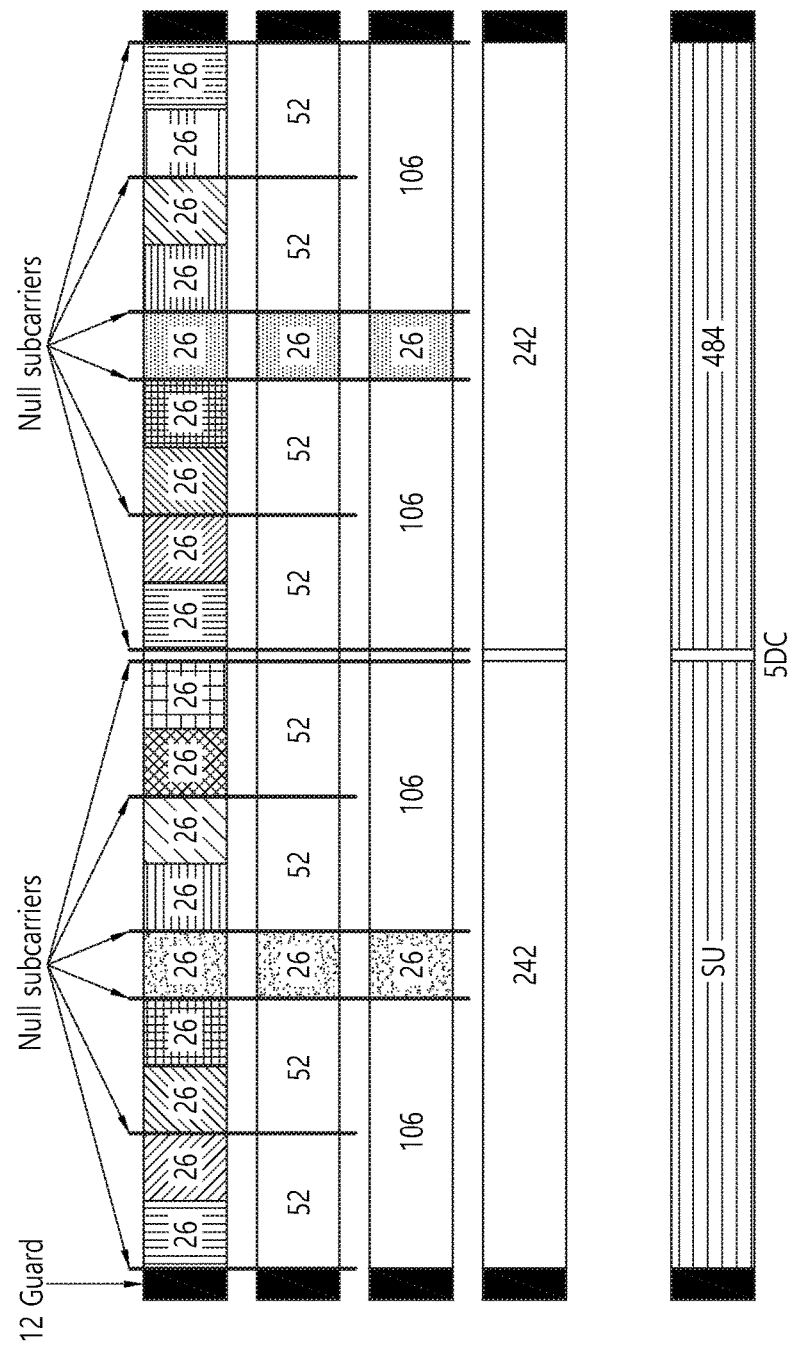
FIG. 5 is a diagram illustrating a layout of resource units (RUs) used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
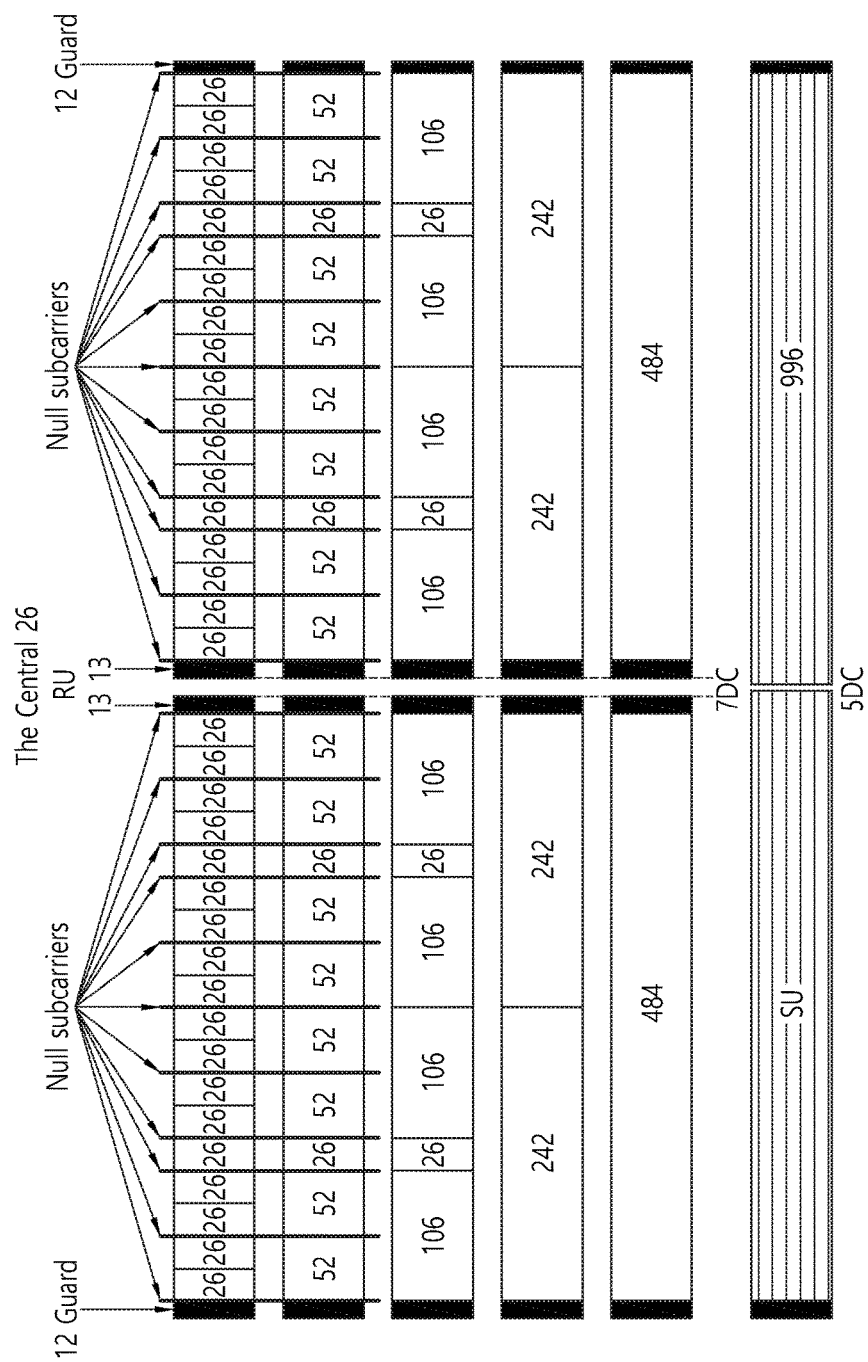
FIG. 6 is a diagram illustrating a layout of resource units (RUs) used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted. Meanwhile, the detailed number of RUs may be modified similarly to one example of each of FIG. 4 or 5.

Figure 7:
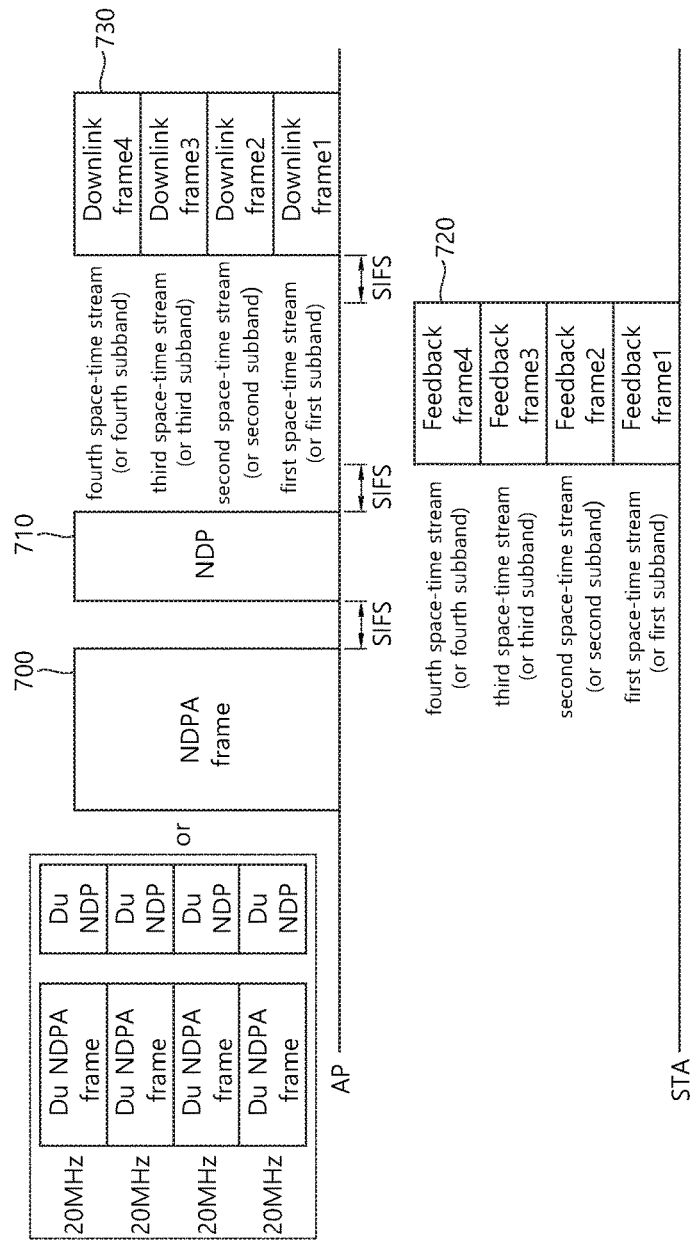
FIG. 7 is a concept view illustrating a method of transmitting a frame on the basis of a sounding procedure according to an embodiment of the present invention.

FIG. 7 is a concept view illustrating a method of transmitting a frame on the basis of a sounding procedure according to an embodiment of the present invention.

Disclosed in FIG. 7 is a method of transmitting a frame on the basis of a sounding procedure for a single STA. The sounding procedure may be a procedure for acquiring channel state information. More specifically, disclosed is a method in which an AP performs the sounding procedure with respect to the STA, and transmits a downlink frame to the STA through SU-MIMO (or OFDMA) or MU-MIMO according to feedback information acquired on the basis of the sounding procedure.

The AP may transmit a null data packet announcement (NDPA) frame 700 to the STA for the sounding procedure, and may transmit an NDP 710 after a specific time (e.g., a short interframe space (SIFS)).

The NDPA frame 700 may be used to report to the STA that the sounding procedure starts and the NDP 710 is transmitted. The NDPA frame 700 may include an STA information field. The STA information field may indicate an STA for receiving the NDP 710 to be transmitted after the NDPA frame 700 and for transmitting a feedback frame. The STA indicated on the basis of the STA information field may estimate a channel on the basis of the NDP 710 and may transmit a feedback frame 720 including the channel state information to the AP. That is, the STA may determine whether to transmit the feedback frame 720 to the AP by participating in channel sounding on the basis of the STA information field included in the received NDPA frame 700.

The NDP 710 may have a format which includes only a PPDU header by omitting a data field from the typical PPDU. The NDP 710 may be precoded by the AP on the basis of a specific precoding matrix. Upon receiving the NDP 710, the STA may estimate a channel on the basis of a training field (e.g., HE-LTF) of the NDP 710 and may acquire channel state information. Since the NDP 710 does not have the data field, length information indicating a PSDU length included in the data field of the NDP 710 or a length of an aggregate-MAC protocol data unit (A-MPDU) included in the PSDU may be set to 0.

Each of the NDPA frame 700 and the NDP 710 may be transmitted through a full bandwidth for transmission of the NDPA frame 700 and the NDP 710. The PPDU format may be expressed by the term 'non-duplicated PPDU format'.

Alternatively, each of the NDPA frame 700 and the NDP 710 may be transmitted through a plurality of channels on the basis of a duplicate PPDU format. The duplicate PPDU format may be transmitted through a bandwidth greater than 20 MHz (e.g., 40 MHz, 80 MHz, 160 MHz, 80 MHz+80 MHz, etc.) by replicating the PPDU format transmitted through an adjacent channel (or a primary channel) (20 MHz). When a duplicate format 450 is used, the same data may be transmitted through each of a plurality of channels (a replication target channel and a replication channel). That is, an NDPA PPDU (or NDP) may be used based on a duplicate format used to carry replicated information through each of a plurality of channels. The NDPA frame 700 and the NDP 710 having the non-duplicate PPDU format or the duplicate PPDU format may be transmitted to at least one STA through at least one space-time stream. If the AP receives a feedback frame from a single STA as shown in FIG. 7, the AP may transmit the NDPA frame 700 and the NDP 710 to the single STA through at least one stream. If the AP receives the feedback frame from the single STA, the NDPA frame 700 may indicate at least one STA for transmitting the feedback frame. An LTF may be transmitted through at least one space-time stream through the NDP 710, and the STA may transmit to the AP a feedback frame including channel state information measured on the basis of the LTF of an indicated space-time stream and an indicated frequency domain.

Alternatively, the NDPA frame 700 and the NDP 710 may be transmitted based on a DL MU transmission method. More specifically, the NDPA frame 700 and the NDP 710 may be transmitted to a plurality of STAs through different space-time streams on the basis of DL MU MIMO transmission, or may be transmitted to the plurality of STAs through different frequency resources (or a subband, a channel) on the basis of DL MU OFDMA. In this case, the NDPA frame 700 and the NDP 710 transmitted through the different space-time streams or the different frequency resources may include different information. That is, the AP may transmit a plurality of NDPA frames respectively to the plurality of STAs, and may transmit a plurality of NDPs respectively to the plurality of STAs. For example, the NDPA frame transmitted through a specific space-time stream or a specific frequency resource may indicate only a specific STA for transmitting a feedback frame.

Hereinafter, an embodiment of the present invention is described for convenience of explanation by assuming a case where an NDPA frame and an NDP are transmitted to at least one STA through at least one stream on the basis of a non-duplicate PPDU format or a duplicate PPDU format.

The STA may perform channel estimation on the basis of the NDP 710, and may transmit acquired channel state information to the AP through the feedback frame 720. A channel bandwidth used for transmission of the feedback frame 720 may be set to be narrower than or equal to a channel bandwidth used for transmission of the NDPA frame 700. The feedback frame 720 may include channel state information (or stream state information) for each of an indicated space-time stream (or spatial stream).

If the NDP 710 is not transmitted based on beamforming, the feedback frame 720 may include a high throughput (HT) control field and a channel information control field (e.g., very high throughput (VHT) MIMO control field or an HE MU control field). The HT control field may include information regarding Nsts (the number of space-time streams), MCS, bandwidth (BW), and SNR. The control information control field may be reserved.

If the NDP 710 is transmitted based on beamforming, the feedback frame 720 may include an HT control field, a channel information control field, and a channel information field. The HT control field may include information regarding Nsts, MCS, BW, and SNR. The channel control field may include information regarding Nc, Nr, Ng, etc., and/or control information for OFDMA-based transmission. The channel information control field may include SNR information per stream, information of a beamforming feedback matrix for each subcarrier, SNR information for each frequency resource (e.g., subband) in OFDMA-based transmission, etc.

A format of the NDPA frame 700, the NDP 710, and the feedback frame 720 is described later in detail.

According to the embodiment of the present invention, upon receiving the NDAP 710, the STA may transmit the feedback frame 720 to the AP after a specific time (e.g., SIFS). The AP may receive the feedback frame 720, and after the specific time (e.g., SIFS), may transmit a downlink frame 730 to the STA on the basis of SU MIMO (or OFDMA/MU-MIMO). The AP may transmit the downlink frame 730 generated based on channel variation information determined by considering channel state information included in the feedback frame 720.

The STA may transmit an ACK or a block ACK to the AP in response to the received downlink frame 730.

If the downlink frame 730 transmitted by the AP receives the feedback frame 720 and is transmitted after the SIFS, a feedback channel state parameter (e.g., Nsts, MCS, BW, SNR, Nc, Nr, Ng, SNR information per stream, information of a beamforming feedback matrix for each subcarrier, SNR information for each frequency resource (e.g., subband) in OFDMA-based transmission, etc.) is relatively accurate, and thus data transmission efficiency may be increased.

Hereinafter, FIG. 8 to FIG. 10 disclose the NDPA PPDU and NPD 710 for carrying the NDPA frame 700 to perform the sounding procedure and the feedback PPDU for carrying the feedback frame 720 in detail according to an embodiment of the present invention.

Figure 8:
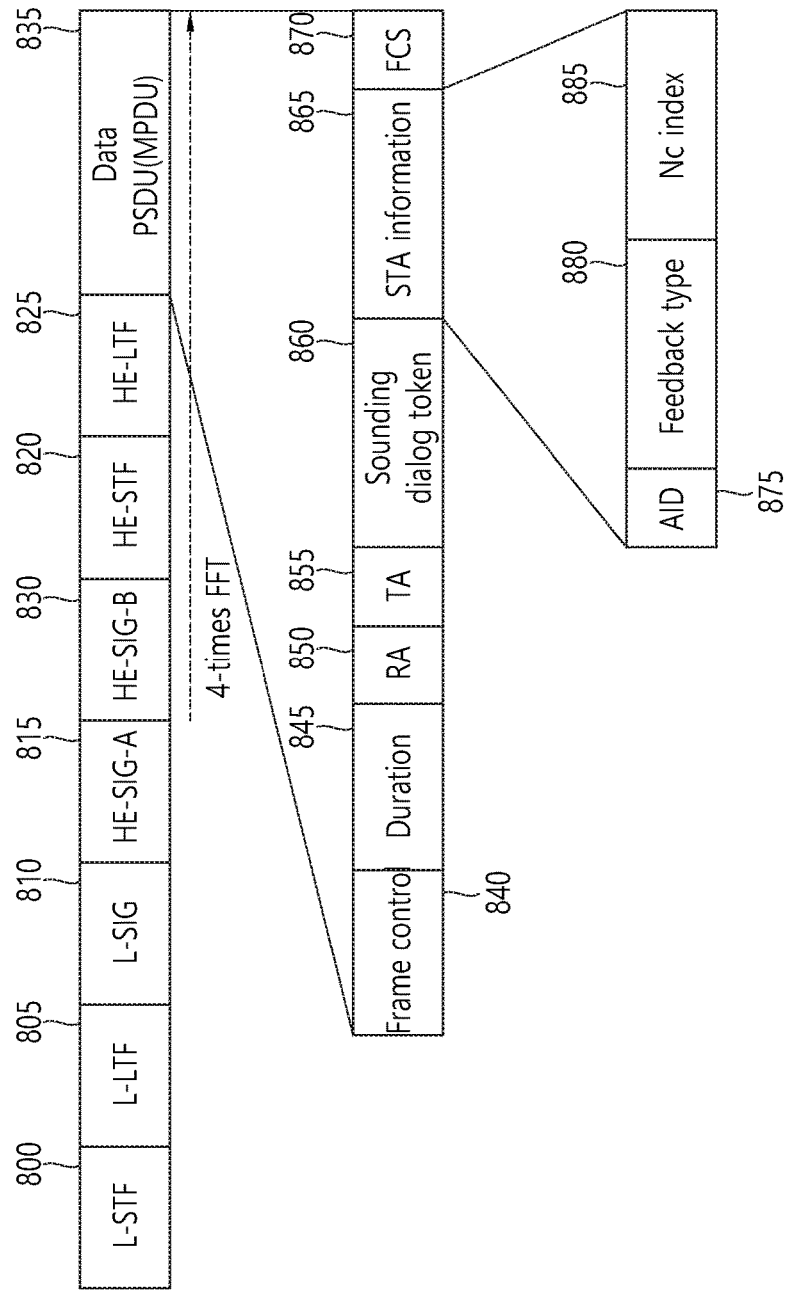
FIG. 8 is a concept view illustrating a format of a null data packet announcement (NDPA) PLCP protocol data unit (PPDU) according to an embodiment of the present invention.

FIG. 8 is a concept view illustrating a format of an NDPA PPDU according to an embodiment of the present invention.

Referring to an upper part of FIG. 8, the NDPA PPDU may include a PPDU header and a PSDU (or MPDU). The PPDU header used herein may include a PHY preamble and a PHY header. A PSDU (or MPDU) of the NPDA PPDU may include an NDPA frame.

The PPDU header of the NDPA PPDU may include a legacy-short training field (L-STF) 800, a legacy-long training field (L-LTF) 805, a legacy-signal (L-SIG) 810, a high efficiency-signal A (HE-SIG A) 815, a high efficiency-signal B (HE-SIG B) 830, a high efficiency-short training field (HE-STF) 820, a high efficiency-long training field (HE-LTF) 825. The PHY header may be divided into a legacy part before the L-SIG 810 and a high efficiency (HE) part after the L-SIG 810.

The L-STF 800 may include a short training orthogonal frequency division multiplexing (OFDM) symbol. The L-STF 800 may be used for frame detection, automatic gain control (AGC), diversity detection, and coarse frequency/time synchronization.

The L-LTF 805 may include a long training OFDM symbol. The L-LTF 805 may be used for fine frequency/time synchronization and channel prediction.

The L-SIG 810 may be used to transmit control information. The L-SIG 810 may include information for a data rate and a data length.

The HE-SIG A 815 may include information indicating an STA for receiving a PPDU. More specifically, the HE-SIG A 815 may include information indicating an STA for receiving an NDPA frame.

In addition, the HE-SIG A 815 may include color bits information for BSS identification information, bandwidth information, a tail bit, a CRC bit, modulation and coding scheme (MCS) information for the HE-SIG B 830, symbol count information for the HE-SIG B 830, and cyclic prefix (CP) (or guard interval (GI)) length information.

The HE-STF 820 may be used to improve automatic gain control estimation in a multiple input multiple output (MIMO) environment or an OFDMA environment.

The HE-LTF 825 may be used to estimate a channel in the MIMO environment or the OFDMA environment.

The HE-SIG B 830 may include a length of physical layer service data unit (PSDU) for each STA, information regarding modulation and coding scheme (MCS), a tail bit, or the like.

A size of inverse fast Fourier transform (IFFT) applied to the HE-STF 820 and a field which comes after the HE-STF 820 may be different from a size of IFFT applied to a field which comes before the HE-STF 820. For example, the size of IFFT applied to the HE-STF 820 and the field which comes after the HE-STF 820 may be four times greater than the size of IFFT applied to the field which comes before the HE-STF 820. The STA may receive the HE-SIG A 815, and may be instructed to receive a downlink PPDU on the basis of the HE-SIG A 815. In this case, the STA may perform decoding on the HE-STF 820 and the field which comes after the HE-STF 820 on the basis of a changed FFT size. On the contrary, if the STA is not instructed to receive the downlink PPDU on the basis of the HE-SIG A 815, the STA may stop decoding and may configure a network allocation vector (NAV). A cyclic prefix (CP) of the HE-STF 820 may have a size greater than a CP of another field, and for this CP duration, the STA may perform decoding on the downlink PPDU by changing the FFT size.

An order of a field constructing the aforementioned NDPA PPDU format may be changed.

For example, an HE-SIG B of an HE part should be located immediately after an HE-SIG A. That is, each field of the HE part may be located in the order of HE-SIG A, HE-SIG B, HE-STF, HE-LTF. The STA may perform decoding on the HE-SIG and up to the HE-SIG B, may receive necessary control information, and may configure an NAV. Likewise, a size of IFFT applied to an HE-STF and a field which comes after the HE-STF may be different from a size of IFFT applied to a field which comes before the HE-STF. The STA may receive the HE-SIG A and the HE-SIG B. If it is instructed to receive the downlink PPDU by the STA identifier field of the HE-SIG A, the STA may perform decoding on the downlink PPDU starting from the HE-STF by changing the FFT size. On the contrary, the STA may receive the HE-SIG A, and if it is not instructed to receive the downlink PPDU on the basis of the HE-SIG A, may configure the NAV.

A PSDU (or MPDU) 835 of the NDPA PPDU may include the NDPA frame. The NDPA frame may include a frame control field 840, a duration field 845, an RA field 850, a TA field 855, a sounding dialog token field 860, an STA information field 865, and an FCS 870.

The frame control field 840 may include a type and subtype for indicating the NDPA frame.

The duration field 845 may include information regarding a duration for protecting transmission of the NDPA frame.

The RA field 850 may include identification information of an STA for receiving the NDPA frame. For example, when the STA information field includes information regarding a single STA, the RA field 850 may include address information of the STA. If the STA information field 865 includes information regarding a plurality of STAs, the RA field 850 may include a broadcast address of the STA. For example, the RA field 850 may include MAC address information of the STA for receiving the NDPA frame.

The TA field 855 may include an address of an AP for transmitting the NDPA frame.

The sounding dialog token field 860 may include information used by the AP for transmitting the NDPA frame to identify the NDPA frame.

The STA information field 865 may include identification information (AID) 875, feedback type information 880, and Nc index information 885 of the STA for receiving the NDPA frame.

Table 1 below discloses information included in the STA information field.

TABLE 1

| Subfield | Description |
| --- | --- |
| AID | AID (assoication identifier) of STA for performing sounding procedure (for receiving NDP to be transmitted later) is included |
| Feedback type | Indicate feedback request type of STA for performing souding procedure<br>Set to '0' in case of SU-MIMO<br>Set to '1' in case of MU-MIMO |
| Nc index | Inidicate requested feedback dimension (information regarding the number of columns of beamforming feedback matrix)<br>In case of MU-MOMO:<br>Set to '0' if Nc=1<br>Set to '1' if Nc=2<br>Set to '2' if Nc=3<br>Set to '3' if Nc=4<br>Set to '4' if Nc=5<br>Set to '5' if Nc=6<br>Set to '6' if Nc=7<br>Set to '7' if Nc=8<br>In case of SU-MIMO, reserved subfield (Set to 0) |

In Table 1, Nc may indicate the number of columns of beamforming feedback matrices included in a feedback frame transmitted in response to an NDP.

Upon receiving an NDPA frame, STAs may confirm an AID sub-field value included in an STA information field, and may confirm whether it is a sounding target STA.

FIG. 8 is one example for an NDPA PPDU. The NDPA PPDU may have the legacy PPDU format (e.g., an HT PPDU format, a VHT PPDU format) instead of the HE-SIG A 815, the HE-STF 820, the HE-LTF 825, and the HE-SIG B 830.

Figure 9:
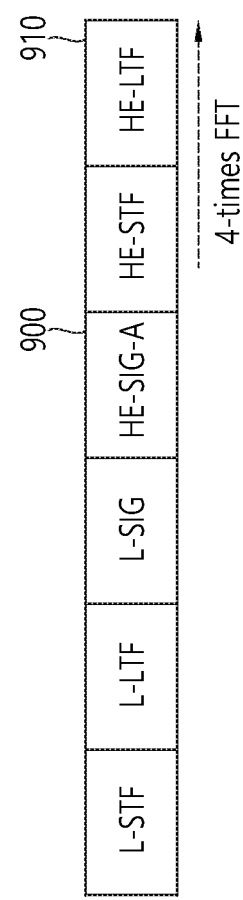
FIG. 9 is a concept view illustrating a null data packet (NDP) according to an embodiment of the present invention.

FIG. 9 is a concept view illustrating an NDP according to an embodiment of the present invention.

Referring to FIG. 9, the NDP may include only a PPDU header except for a PSDU (or MPDU).

As described above, the NDP (or PPDU header) may include a legacy part and a non-legacy part. Each field included in the legacy part and the non-legacy part may perform a role described above in FIG. 8 for transmission of the NDP.

For example, an HE-SIG A 900 may include information indicating an STA for receiving the NDP.

An HE-LTF 910 may be used for channel estimation of the STA. That is, the STA may perform channel estimation on the basis of the HE-LTF 910 included in the NDP frame, and may generate a feedback frame on the basis of a result of the channel estimation.

An HE-SIG B 920 may include information which indicates a PSDU length of 0.

As described above in FIG. 8, an order of some fields included in the aforementioned NDP may be changed. That is, each field of the PPDU header may be located in the order of HE-SIG A, HE-STF, and HE-LTF.

Figure 10:
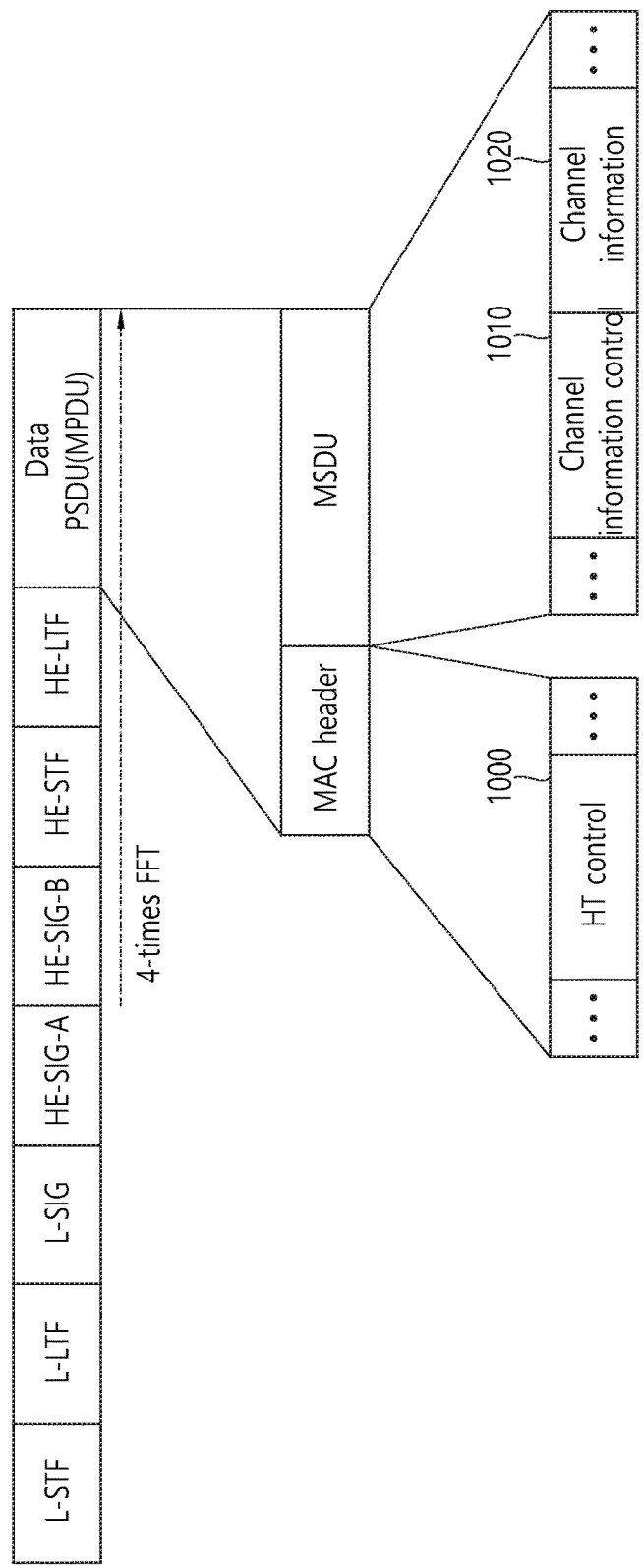
FIG. 10 is a concept view illustrating a feedback PPDU according to an embodiment of the present invention.

FIG. 10 is a concept view illustrating a feedback PPDU according to an embodiment of the present invention.

Referring to FIG. 10, the feedback PPDU may include a PPDU header and a PSDU (or MPDU). The PSDU (or MPDU) of the feedback PPDU may include a feedback frame.

The PPDU header of the feedback PPDU may include a legacy part and a non-legacy part. Each field included in the legacy part and the non-legacy part may perform a role described above in FIG. 8 for the feedback PPDU.

A MAC header of the feedback frame may include an HT control field 1000, and the MSDU may include a channel information control field 1010 and a channel information field 1020. If beamforming is not used in the sounding procedure as described above, the channel information control field 1010 and the channel information field 1020 may not be included in the feedback frame or may be reserved, and the feedback frame may include only the HT control field 1000. Only when the beamforming is used in the sounding procedure, the feedback frame may include the channel information control field 1010 and the channel information field 1020.

The HT control field 1010 may include an MCS feedback (MFB) field. The MFB field may include information N_STS regarding the number of recommended space-time streams, information MCS regarding a recommended MCS index, information BW regarding a bandwidth size intended by a recommended MCS, and information regarding an average SNR measured on all space-time streams and sub-carriers for transmitting data.

Table 2 and Table 3 show a format of the channel information control field 1010 and the channel information field 1020.

Table 2 below discloses information included in the channel information control field 1010.

TABLE 2

| Subfield | Description |
| --- | --- |
| Nc index | Inidicate a value obtained by subtracting 1 from the number Nc of columns of a beamforming feedback matrix<br>Set to 0 if Nc=1<br>Set to 1 if Nc=2<br>...<br>Set to 7 if Nc=8 |
| Nr index | Inidicate a value obtained by subtracting 1 from the number Nrc of rows of a beamforming feedback matrix<br>Set to 0 if Nc=1<br>Set to 1 if Nc=2<br>...<br>Set to 7 if Nc=8 |

TABLE 2-continued

| Subfield | Description |
| --- | --- |
| Channel bandwidth | Indicate a size of a channel bandwidth measured for generation of a beamforming feedback matrix<br>Set to 0 if 20MHz<br>Set to 1 if 40MHz<br>Set to 2 if 80MHz<br>Set to 3 if 160MHz or 80+80MHz |
| Grouping, Ng | Inidicate subcarrier grouping used for a beamforming feedback matrix<br>Set to 0 if Ng=1 (no grouping)<br>Set to 1 if Ng=2<br>Set to 2 if Ng=4<br>(3 is reserved) |
| Codebook information | Inidicate a size of codebook entries |
| Feedback type | Inidicate whether it is beamforming feedback for SU-MIMO or beamforming feedback for MU-MIMO |
| Sounduing sequence | Sequency number from NDPA for requesting feedback |

Table 3 below describes information included in the channel information field 1020.

TABLE 3

| Subfield | Description |
| --- | --- |
| SNR(signal to noise ratio) of spatial stream 1 | Average SNR on subcarriers in recipient for spatial stream 1 |
| ... | ... |
| SNR of spatial stream Nc | Average SNR on subcarriers in recipient for spatial stream Nc |
| Beamforming feedback matrix (subcarrier index 0) | Order of angles for determining beamforming feedback matrix or corresponding subcarrier |
| Beamforming feedback matrix (subcarrier index 1) | Order of angles of beamforming feedback matrix for corresponding subcarrier |
| ... | ... |
| Beamforming feedback matrix (subcarrier index Ns) | Order of angles of beamforming feedback matrix for corresponding subcarrier |
| SNR(signal to noise ratio) of subband 1 | Average SNR on subcarrier included in subband 1 in recipient |
| ... | ... |
| SNR of subband Nk | Average SNR on subcarrier included in subband Nk in recipient |

Information of the channel information field 1020 disclosed in Table 3 may be interpreted on the basis of information included in the channel control field 1010 disclosed in Table 2. For example, the AP may receive a feedback frame, and a subcarrier index Ns may be determined on the basis of channel bandwidth information and grouping information of the channel information control field 1010.

According to another embodiment of the present invention, in the grouping field Ng, a reserved 3(0x11) may be used for a subband-unit feedback. If the grouping field Ng is 3, it may indicate the subband-unit feedback. If Ng=3, an SNR or a beamforming feedback matrix (or a matrix vector) may be fed back in a subband unit. For example, a subband unit for a feedback may be fixed in unit of 26 tones or may be set to an additional unit (e.g., a tone corresponding to a multiple unit of 26 tones) on the basis of an additional subband related field.

In addition, an SNR or a beamforming feedback matrix (or a matrix vector) for a full frequency band may be transmitted through a feedback PPDU irrespective of whether grouping is achieved.

In addition, an Nc index count may be defined as not being singular (e.g., Nc) but being plural (e.g., Nc1, Nc2, etc.), and thus a plurality of pieces of feedback information corresponding to the plurality of Nc may be included in the feedback frame.

In the wireless LAN system to which the embodiment of the present description is applied, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, when the uplink transmission by the plurality of respective STAs (e.g., non-AP STAs) is performed on the frequency domain, the AP may allocate the different frequency resources to the plurality of respective STAs as the uplink transmission resources based on the OFDMA. Further, as described above, the different frequency resources may be different subbands (alternatively, sub channels) or different resources units (RUs).

The different frequency resources are indicated through a trigger frame with respect to the plurality of respective STAs.

Figure 11:
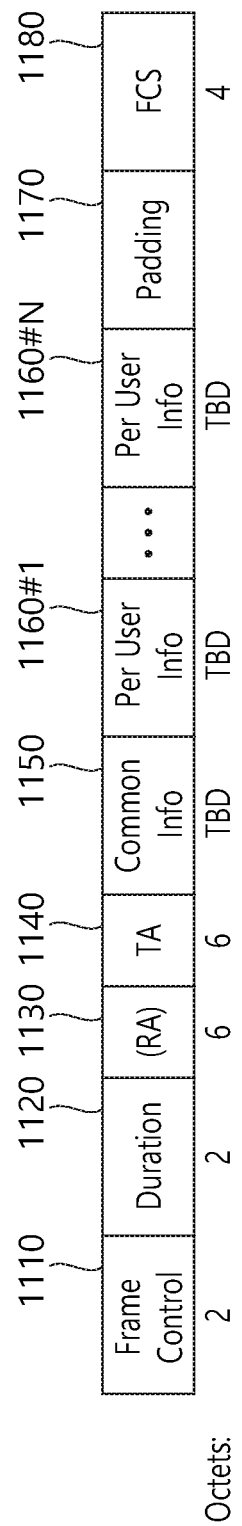
FIG. 11 illustrates an example of a trigger frame.

FIG. 11 illustrates an example of a trigger frame. The trigger frame of FIG. 11 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 11 may be partially omitted, or other fields may be added. Moreover, the length of each field may be varied differently as shown in the drawing.

A Frame Control field 1110 shown in FIG. 11 may include information related to a version of the MAC protocol and other additional control information, and a Duration field 1120 may include time information for configuring a NAV or information related to an identifier (e.g., AID) of the user equipment.

Additionally, a RA field 1130 may include address information of a receiving STA of the corresponding trigger frame, and this field may also be omitted as required. A TA field 1140 may include address information of the STA (e.g., AP) transmitting the corresponding trigger frame, and a common information field 1150 may include common control information that is applied to the receiving STA receiving the corresponding trigger frame.

Figure 12:
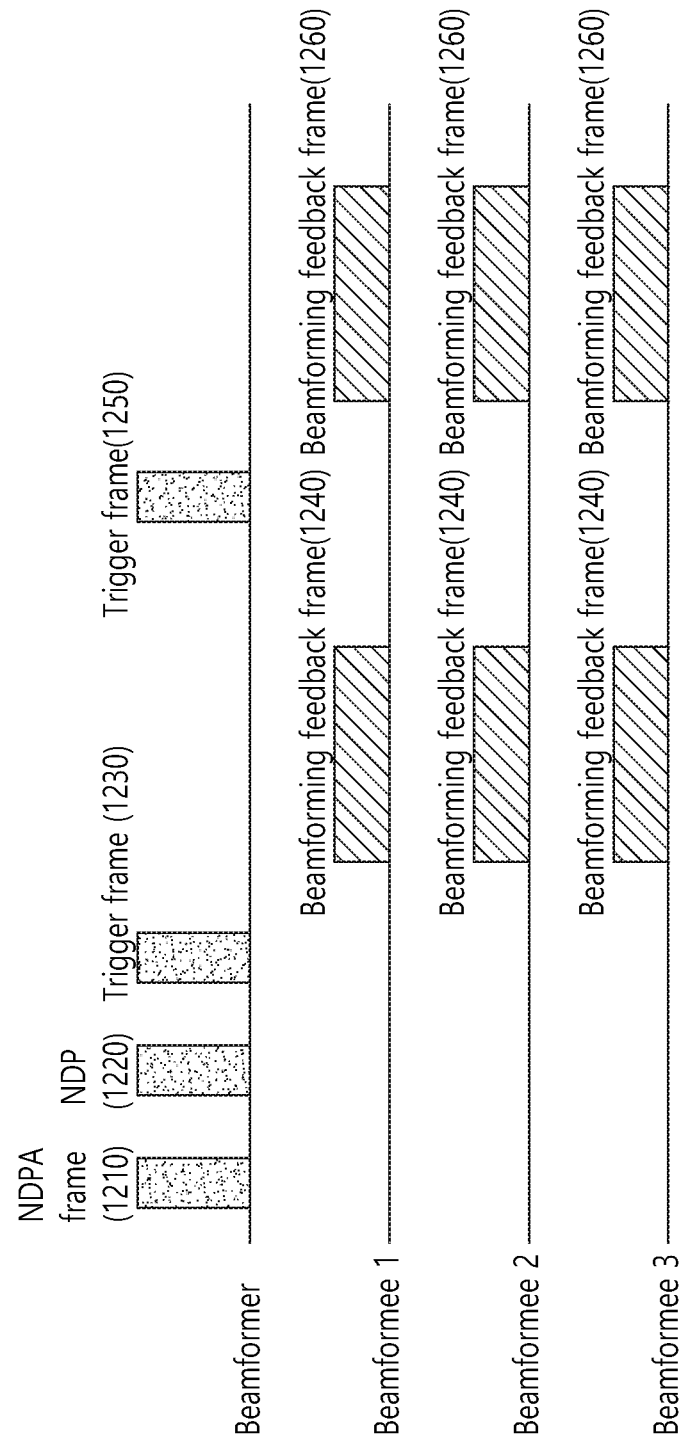
FIG. 12 is a conceptual diagram showing a method for transmitting an MU-MIMO frame based on a sounding procedure according to the present embodiment.

FIG. 12 is a conceptual diagram showing a method for transmitting an MU-MIMO frame based on a sounding procedure according to the present embodiment.

FIG. 12 discloses a method for transmitting a frame based on a sounding procedure for a plurality of STAs. More specifically, a beamformer hat has transmitted an NDPA frame 1210 having at least one STA information field may transmit a beamforming report poll trigger frame 1230 after an SIFS since the NDP frame 1210 was transmitted. This reason for this is that the beamformer receives a beamforming feedback frame 1240 from a beamformee designated in the same TXOP. Furthermore, the beamformer receive the beamforming feedback frame 1240 and then may transmit an additional beamforming report poll trigger frame after an SIFS. The reason for this is that the beamformer subsequently receives beamforming feedback from the beamformee differently designated in the same TXOP.

That is, the beamformee may transmit a beamforming feedback frame in response to the beamforming report poll trigger frame (or the trigger frame). The beamforming report poll trigger frame includes the AID of an STA included in the user information fields 1160#1, . . . , 1160#N shown in FIG. 11.

In the 802.11ax system, a tone plan has been determined and to use a pilot position unified based on the pilot position of the 26-RU has been adopted regardless of non-OFDMA and OFDMA.

There is proposed a pilot sequence in this situation, and there is proposed a unified pilot sequence in which a pilot coefficient having the same position always has the same value regardless of the size of an RU. That is, there is proposed a pilot sequence from a viewpoint of a simple unified structure not from a viewpoint of a peak-to-average power ratio (PAPR). Since a random signal is already transmitted within a data part, the PAPR is not greatly influenced by the values of a small number of pilot sequences and it is difficult to optimize the PAPR from a viewpoint of the PAPR.

In this case, a pilot shift according to a symbol index is not taken into consideration. If a pilot shift is taken into consideration as in the 802.11ac system, there may be proposed a unified pilot sequence in a symbol index 0 (a different index may be not problematic). Furthermore, a pilot shift may be performed based on the unified pilot sequence.

In the pilot sequence, the coefficients of the existing 802.11ac and 802.11ah systems are reused as much as possible. In this specification, a method for configuring a pilot sequence may be divided into two options. The option 1 is a method for extending to another RU using the 80 MHz pilot coefficient of the existing 802.11ac system in a 242-tone RU and reusing the existing method as much as possible even in another RU. The option 2 is a method for extending to another RU by reusing the 1 MHz pilot coefficient of the existing 802.11ah system based on a 26-tone RU. In this case, the existing method is reused only in the 26-tone RU, and the same pilot sequence can be guaranteed with respect to an RU having the same size.

Example (1)—20 MHz

First, a method for configuring a feedback tone index (or a feedback subcarrier index) for transmission in a 20 MHz band is described below.

Figure 13:
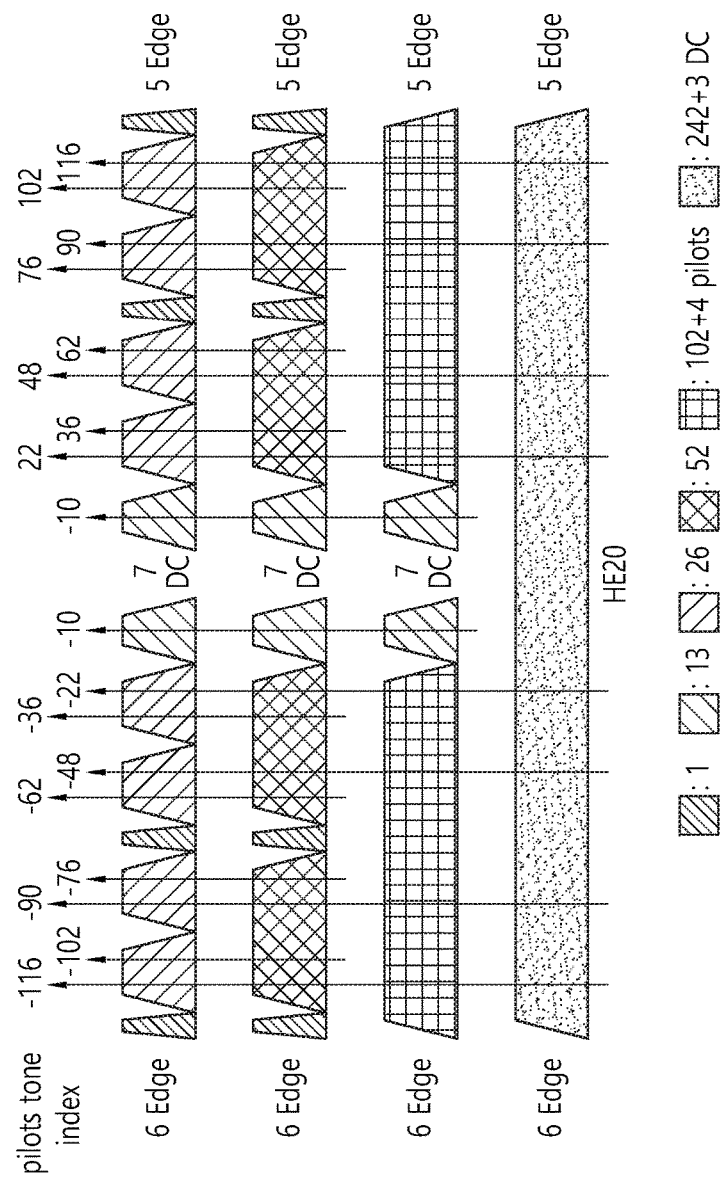
FIG. 13 is a diagram showing a pilot subcarrier index in a resource unit (RU) used on a 20 MHz band according to the present embodiment.

FIG. 13 is a diagram showing a pilot subcarrier index in a resource unit (RU) used on a 20 MHz band according to the present embodiment.

Referring to FIG. 13, if a 26-RU and/or a 52-RU is used on the 20 MHz band, a pilot subcarrier index may be ±{10, 22, 36, 48, 62, 76, 90, 102, 116}. If a 106-RU and/or 242-RU (full band) is used on the 20 MHz band, a pilot subcarrier index may be ±{22, 48, 90, 116}.

On the 20 MHz band, a first or ninth 26-RU may be indicated as a tone index range of ±{121:96}. A second or eighth 26-RU may be indicated as a tone index range of ±{95:70}. A third or seventh 26-RU may be indicated as a tone index range of ±{68:43}. A fourth or sixth 26-RU may be indicated as a tone index range of ±{42:17}. A fifth (middle) 26-RU may be indicated as a tone index range of ±{16:4}.

Furthermore, on the 20 MHz band, a first or fourth 52-RU may be indicated as a tone index range of ±{121:70}. A second or third 52-RU may be indicated as a tone index range of ±{68:17}. A first or second 106-RU may be indicated as a tone index range of ±{122:17}. A full bandwidth (242-RU) may be indicated as a tone index range of ±{122:2}.

(1)-A) Method for Configuring Pilot Sequence—Option 1

If a predetermined frequency band is 20 MHz and the method of the option 1 is used, a pilot sequence set for each RU is as follows.

26-RUs (2 Pilots)

The pilot sequence is configured by reusing the pilot sequence {1 −1} of the existing 802.11ah system in the second and fourth 26-RUs. Furthermore, the pilot sequence is configured by reusing {−1 1} obtained by changing the order of the pilot sequence {1 −1} of the existing 802.11ah system in the sixth and eighth 26-RUs. Furthermore, the pilot sequence is set as {1 1} for a unified structure in the first, third, fifth, seventh, and ninth 26-RUs. In this case, the pilot sequence may be set as {−1 −1} in the fifth 26-RU. If the pilot sequence {1 1} is not reused, it is difficult to reuse an existing pilot sequence in another RU as much as possible.

52-RUs (4 Pilots)

The pilot sequence is configured by reusing the pilot sequence {1 1 1 −1} of the existing 802.11ac system in the first and second 52-RUs. Furthermore, the pilot sequence is configured by reusing {−1 1 1 1} obtained by changing the order of the pilot sequence of the existing 802.11ac system in the third and fourth 52-RUs.

106-RUs (4 Pilots)

The pilot sequence is configured by reusing the pilot sequence {1 1 1 −1} of the existing 802.11ac system in the first 106-RU. Furthermore, the pilot sequence is configured by reusing {−1 1 1 1} obtained by changing the order of the pilot sequence of the existing 802.11ac system in the second 106-RU.

A Full Bandwidth (242-RUs, Four Pilots)

The pilot sequence is configured by reusing the pilot sequence {1 1 1 −1 −1 1 1 1} of the existing 802.11ac system in the full bandwidth.

In summary, the pilot sequence of a pilot subcarrier index ±{10, 22, 36, 48, 62, 76, 90, 102, 116} set on the 20 MHz band may be set as {1/−1 −1 1 1 1 −1 1 1 1}. A pilot sequence indicated by "a/b" indicates that the corresponding pilot sequence may be "a" or "b." This may be different depending on a pilot coefficient of the middle 26-RU.

(1)-B) Method for Configuring Pilot Sequence—Option 2

If a predetermined frequency band is 20 MHz and the method of the option 2 is used, a pilot sequence set for each RU is as follows.

26-RUs (2 Pilots)

The pilot sequence is configured by reusing the pilot sequence {1 −1} of the existing 802.11ah system in each 26-RU. If the method of the option 2 is used, a pilot sequence in another RU may be determined based on the 26-RU because the existing method is reused only in the 26-RU. Furthermore, if the method of the option 2 is used, the same pilot sequence can be guaranteed with respect to an RU having the same size.

52-RUs (4 Pilots)

The pilot sequence is set as {1 −1 1 −1} in each 52-RU. In this case, the pilot sequence in the 52-RU has been determined based on the 26-RU in which the pilot sequence {1 −1} of the existing 802.11ah system has been reused.

106-RUs (4 Pilots)

The pilot sequence is set as {1 1 −1 −1} in each 106-RU. In this case, the pilot sequence in the 106-RU has been determined based on the pilot coefficients in the 26-RU and 106-RU in which the pilot sequence {1 −1} of the existing 802.11ah system has been reused.

A Full Bandwidth (242-RU, Four Pilots)

The pilot sequence is set as {1 1 −1 −1 1 1 −1 −1} in the full bandwidth. In this case, the pilot sequence in the full bandwidth has been determined based on the pilot coefficients in the 26-RU in which the pilot sequence {1 −1} of the existing 802.11ah system has been reused and in the full bandwidth.

In summary, the pilot sequence of the pilot subcarrier index {−116 −102 −90 −76 −62 −48 −36 −22 −10 10 22 36 48 62 76 90 102 116} set on the 20 MHz band may be set as {1, −1, 1, −1, 1, −1, 1, −1, 1, −1, 1, −1, 1, −1, 1, −1, 1, −1}.

Example (2)—40 MHz

A method for configuring a feedback tone index (or a feedback subcarrier index) for transmission in a 40 MHz band is described below.

Figure 14:
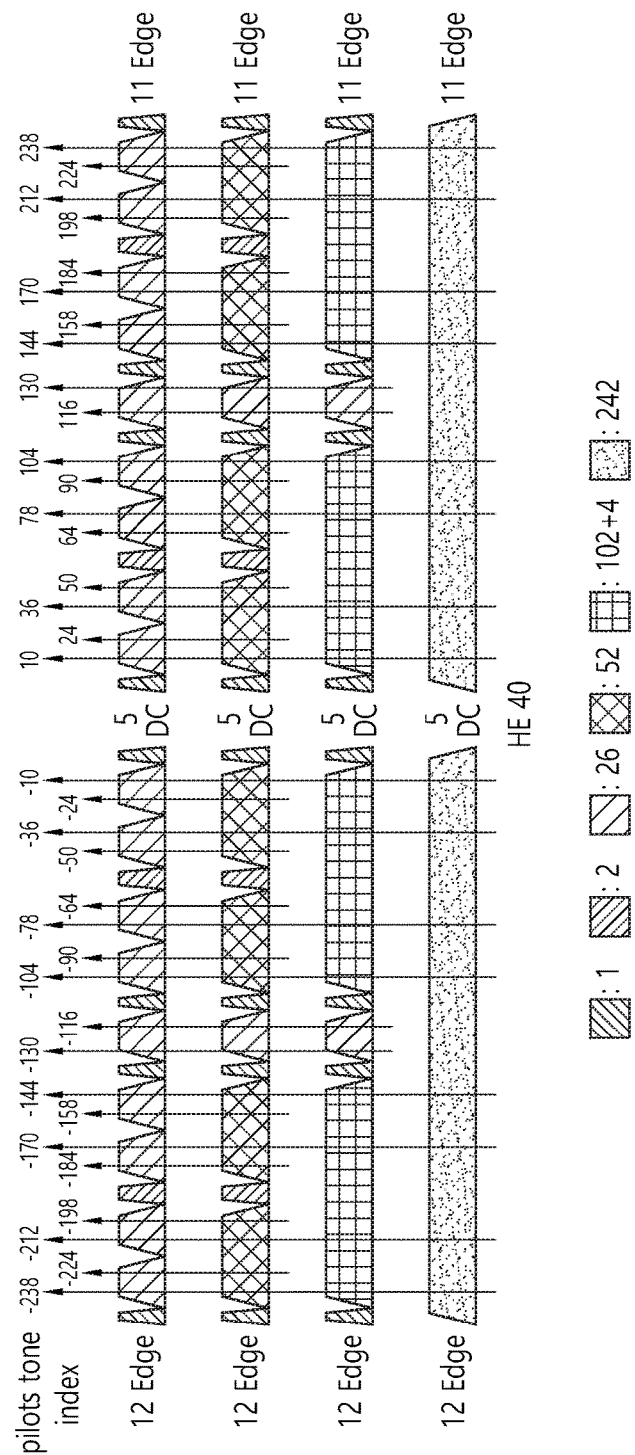
FIG. 14 is a diagram showing a pilot subcarrier index used on a 40 MHz band in a resource unit (RU) according to the present embodiment.

FIG. 14 is a diagram showing a pilot subcarrier index used on a 40 MHz band in a resource unit (RU) according to the present embodiment.

Referring to FIG. 14, if a 26-RU and/or a 52-RU is used on the 40 MHz band, a pilot subcarrier index may be ±{10, 24, 36, 50, 64, 78, 90, 104, 116, 130, 144, 158, 170, 184, 198, 212, 224, 238}. If a 106-RU and/or a 242-RU and/or a 484-RU (full band) is used on the 40 MHz band, a pilot subcarrier index may be ±{10, 36, 78, 104, 144, 170, 212, 238}.

On the 40 MHz band, a first or eighteenth 26-RU may be indicated as a tone index range of ±{243:218}. A second or seventeenth 26-RU may be indicated as a tone index range of ±{217:192}. A third or sixteenth 26-RU may be indicated as a tone index range of ±{189:164}. A fourth or fifteenth 26-RU may be indicated as a tone index range of ±{163:138}. A fifth or fourteenth 26-RU may be indicated as a tone index range of ±{136:111}. A sixth or thirteenth 26-RU may be indicated as a tone index range of ±{109:84}. A seventh or twelfth 26-RU may be indicated as a tone index range of ±{83:58}. An eighth or eleventh 26-RU may be indicated as a tone index range of ±{55:30}. A ninth or tenth 26-RU may be indicated as a tone index range of ±{29:4}.

Furthermore, on the 40 MHz band, a first or eighth 52-RU may be indicated as a tone index range of ±{243:192}. A second or seventh 52-RU may be indicated as a tone index range of ±{189:138}. A third or sixth 52-RU may be indicated as a tone index range of ±{109:58}. A fourth or fifth 52-RU may be indicated as a tone index range of ±{55:4}.

Furthermore, on the 40 MHz band, a first or fourth 106-RU may be indicated as a tone index range of ±{243:138}. A second or third 106-RU may be indicated as a tone index range of ±{109:4}. A first or second 242-RU may be indicated as a tone index range of ±{244:3}. A full bandwidth (484-RU) may be indicated as a tone index range of ±{244:3}.

(2)-A) Method for Configuring Pilot Sequence—Option 1

If a predetermined frequency band is 40 MHz and the method of the option 1 is used, a pilot sequence set for each RU is as follows.

26-RUs (2 Pilots)

The pilot sequence is configured by reusing the pilot sequence {1 −1} of the existing 802.11ah system in the second, fourth, eleventh, and thirteenth 26-RUs. Furthermore, the pilot sequence is configured by reusing {−1 1} obtained by changing the order of the pilot sequence {1 −1} of the existing 802.11ah system in the sixth, eighth, fifteenth, and seventeenth 26-RUs. Furthermore, the pilot sequence is set as {1 1} for a unified structure in the first, third, fifth, seventh, ninth, tenth, twelve, fourteenth, sixteenth, and eighteenth 26-RUs. In this case, the pilot sequence may also be set as {−1 −1} in the fifth and fourteenth 26-RUs. Alternatively, the pilot sequence may be set as {1 −1} in the fifth RU and may be set as {−1 1} in the fourteenth 26-RU. Alternatively, the pilot sequence may be set as {−1 1} in the fifth RU and may be set as {1 −1} in the fourteenth 26-RU.

52-RUs (4 Pilots)

The pilot sequence is configured by reusing the pilot sequence {1 1 1 −1} of the existing 802.11ac system in the first, second, fifth, and sixth 52-RUs. Furthermore, the pilot sequence is configured by reusing {−1 1 1 1} obtained by changing the order of the pilot sequence of the existing 802.11ac system in the third, fourth, seventh, and eighth 52-RUs.

106-RUs (4 Pilots)

The pilot sequence is configured by reusing the pilot sequence {1 1 1 −1} of the existing 802.11ac system in the first and third 106-RUs. Furthermore, the pilot sequence is configured by reusing {−1 1 1 1} obtained by changing the order of the pilot sequence of the existing 802.11ac system in the second and fourth 106-RUs.

242-RUs (8 Pilots)

The pilot sequence is configured by reusing the pilot sequence {1 1 1 −1 −1 1 1 1} of the existing 802.11ac system in the first and second 242-RUs.

A Full Bandwidth (484-RU, 16 Pilots)

The pilot sequence is set as {1 1 1 −1 −1 1 1 1 1 1 1 −1 −1 1 1 1} in the full bandwidth.

In summary, the pilot sequence of a pilot subcarrier index {10 24 36 50 64 78 90 104 116 130 144 158 170 184 198 212 224 238} set on the 40 MHz band may be set as {1 1 1 −1 1 1 1 −1 1/−1 1/−1 −1 1 1 1 −1 1 1 1}. A pilot sequence indicated by "a/b" indicates that the corresponding pilot sequence may be "a" or "b." This may be different depending on a pilot coefficient of the middle 26-RU.

(2)-B) Method for Configuring Pilot Sequence—Option 2

If a predetermined frequency band is 40 MHz and the method of the option 2 is used, a pilot sequence set for each RU is as follows.

26-RUs (2 Pilots)

The pilot sequence is configured by reusing the pilot sequence {1 −1} of the existing 802.11ah system in each 26-RU. If the method of the option 2 is used, a pilot sequence in another RU may be determined based on the 26-RU because the existing method is used only in the 26-RU. Furthermore, if the method of the option 2 is used, the same pilot sequence can be guaranteed with respect to an RU having the same size.

52-RUs (4 Pilots)

The pilot sequence is set as {1 −1 1 −1} in each 52-RU. In this case, the pilot sequence in the 52-RU has been determined based on the 26-RU in which the pilot sequence {1 −1} of the existing 802.11ah system has been reused.

106-RUs (4 Pilots)

The pilot sequence is set as {1 1 −1 −1} in each 106-RU. In this case, the pilot sequence in the 106-RU has been determined based on the pilot coefficients in the 26-RU and the 106-RU in which the pilot sequence {1 −1} of the existing 802.11ah system has been reused.

242-RUs (8 Pilots)

The pilot sequence is set as {1 1 −1 −1 1 1 −1 −1} in each 242-RU. In this case, the pilot sequence in the 242-RU has been determined based on the pilot coefficients in the 26-RU and 242-RU in which the pilot sequence {1 −1} of the existing 802.11ah system has been reduced.

A Full Bandwidth (484-RU, 16 Pilots)

The pilot sequence is set as {1 1 −1 −1 1 1 −1 −1 1 1 −1 −1 1 1 −1 −1} in the full bandwidth. In this case, the pilot sequence in the full bandwidth has been determined based on the pilot coefficients in the 26-RU in which the pilot sequence {1 −1} of the existing 802.11ah system has been reused and the full bandwidth.

In summary, the pilot sequence of a set pilot subcarrier index {238 224 212 198 184 170 158 144 130 116 104 90 78 64 50 36 14 10 10 14 36 50 64 78 90 104 116 130 144 158 170 184 198 212 224 238} set on the 40 MHz band may be set as {1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1}.

Example (3)—80 MHz

A method for configuring a feedback tone index (or a feedback subcarrier index) for transmission in an 80 MHz band is described below.

Figure 15:
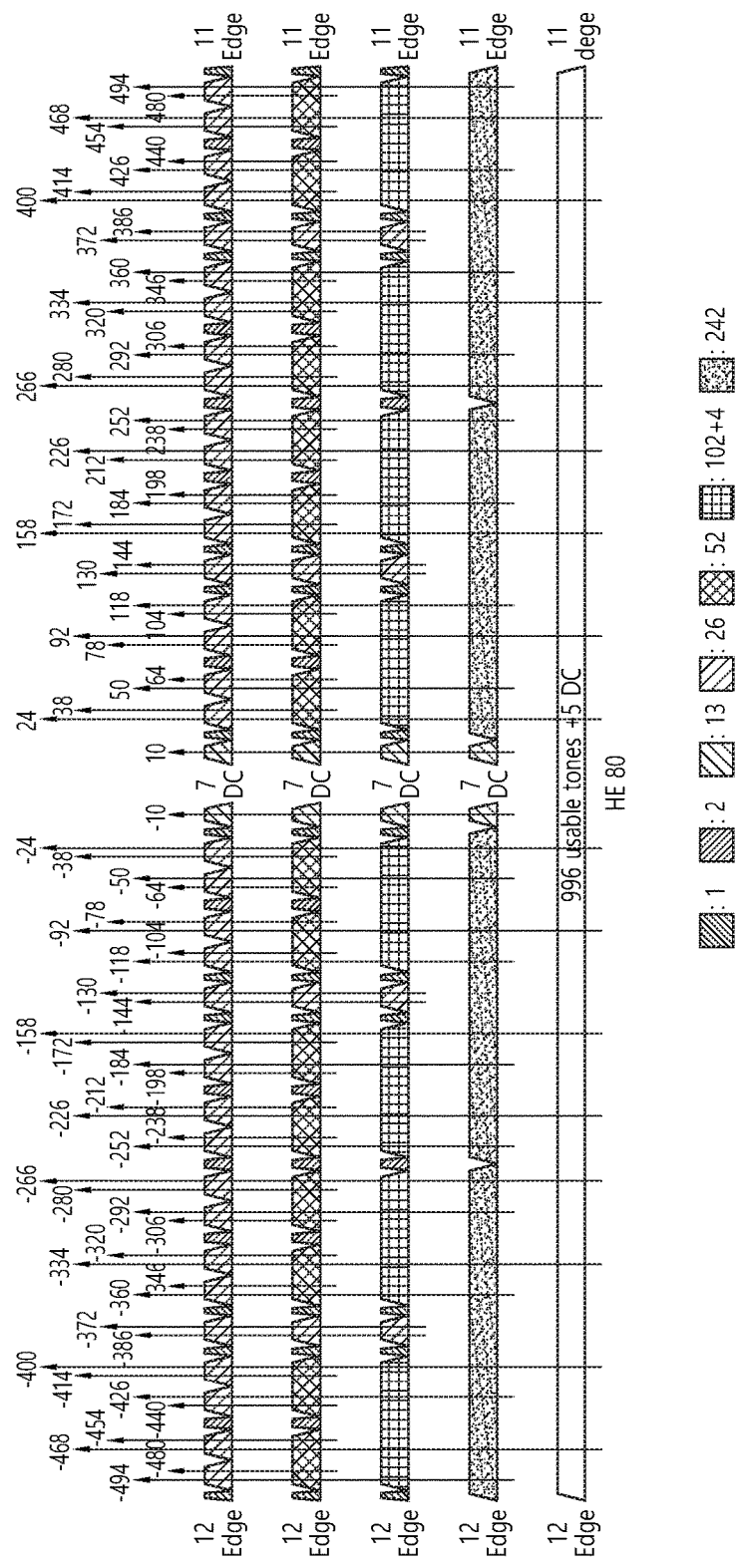
FIG. 15 is a diagram showing a pilot subcarrier index used on an 80 MHz band in a resource unit (RU) according to the present embodiment.

FIG. 15 is a diagram showing a pilot subcarrier index used on an 80 MHz band in a resource unit (RU) according to the present embodiment.

Referring to FIG. 15, if a 26-RU and/or a 52-RU is used on the 80 MHz band, a pilot subcarrier index may be ±{10, 24, 38, 50, 64, 78, 92, 104, 118, 130, 144, 158, 172, 184, 198, 212, 226, 238, 252, 266, 280, 292, 306, 320, 334, 346, 360, 372, 386, 400, 414, 426, 440, 454, 468, 480, 494}. If a 106-RU and/or a 242-RU and/or a 484-RU (full band) is used on the 80 MHz band, a pilot subcarrier index may be ±{24, 50, 92, 118, 158, 184, 226, 252, 266, 292, 334, 360, 400, 426, 468, 494}. If a 996-RU (full band) is used on the 80 MHz band, a pilot subcarrier index may be ±{24, 92, 158, 226, 266, 334, 400, 468}.

On the 80 MHz band, the first or thirty-seventh 26-RU may be indicated as a tone index range of ±{499:474}. The second or thirty-sixth 26-RU may be indicated as a tone index range of ±{473:448}. The third or thirty-fifth 26-RU may be indicated as a tone index range of ±{445:420}. The fourth or thirty-fourth 26-RU may be indicated as a tone index range of ±{419:394}. The fifth or thirty-third 26-RU may be indicated as a tone index range of ±{392:367}. The sixth or thirty-second 26-RU may be indicated as a tone index range of ±{365:340}. The seventh or thirty-first 26-RU may be indicated as a tone index range of −{339:314}. The eighth or thirtieth 26-RU may be indicated as a tone index range of ±{311:286}. The ninth or twenty-ninth 26-RU may be indicated as a tone index range of ±{285:260}. The tenth or twenty-eighth 26-RU may be indicated as a tone index range of ±{257:232}. The eleventh or twenty-seventh 26-RU may be indicated as a tone index range of ±{231:206}. The twelfth or twenty-sixth 26-RU may be indicated as a tone index range of ±{203:178}. The thirteenth or twenty-fifth 26-RU may be indicated as a tone index range of ±{177:152}. The fourteenth or twenty-fourth 26-RU may be indicated as a tone index range of ±{150:125}. The fifteenth or twenty-third 26-RU may be indicated as a tone index range of ±{123:98}. The sixteenth or twenty-second 26-RU may be indicated as a tone index range of ±{97:72}. The seventeenth or twenty-first 26-RU may be indicated as a tone index range of ±{69:44}. The eighteenth or twentieth 26-RU may be indicated as a tone index range of ±{43:18}. The nineteenth (middle) 26-RU may be indicated as a tone index range of ±{16:4}.

Furthermore, on the 80 MHz band, the first or sixteenth 52-RU may be indicated as a tone index range of ±{499:448}. The second or fifteenth 52-RU may be indicated as a tone index range of ±{445:394}. The third or fourteenth 52-RU may be indicated as a tone index range of ±{365:314}. The fourth or thirteenth 52-RU may be indicated as a tone index range of ±{311:260}. The fifth or twelfth 52-RU may be indicated as a tone index range of ±{257:206}. The sixth or eleventh 52-RU may be indicated as a tone index range of ±{203:152}. The seventh or tenth 52-RU may be indicated as a tone index range of ±{123:72}. The eighth or ninth 52-RU may be indicated as a tone index range of ±{69:18}.

Furthermore, on the 80 MHz band, the first or eighth 106-RU may be indicated as a tone index range of ±{499:394}. The second or seventh 106-RU may be indicated as a tone index range of ±{365:260}. The third or sixth 106-RU may be indicated as a tone index range of ±{257:152}. The fourth or fifth 106-RU may be indicated as a tone index range of ±{123:18}. The first or fourth 242-RU may be indicated as a tone index range of ±{500:259}. The second or third 242-RU may be indicated as a tone index range of ±{258:17}. The first or second 484-RU may be indicated as a tone index range of ±{500:17}. The full bandwidth (996-RU) may be indicated as a tone index range of ±{500:3}.

(3)-A) Method for Configuring Pilot Sequence—Option 1

If a predetermined frequency band is 80 MHz and the method of the option 1 is used, a pilot sequence set for each RU is as follows.

26-RUs (2 Pilots)

The pilot sequence is configured by reusing the pilot sequence {1 −1} of the existing 802.11ah system in the second, fourth, eleventh, thirteenth, twenty-first, twenty-third, thirtieth, and thirty-second 26-RUs. Furthermore, the pilot sequence is configured by reusing {−1 1} obtained by changing the order of the pilot sequence {1 −1} of the existing 802.11ah system in the sixth, eighth, fifteenth, seventeenth, twenty-fifth, twenty-seventh, thirty-fourth, and thirty-sixth 26-RUs. Furthermore, the pilot sequence is set as {1 1} for a unified structure in the first, third, fifth, seventh, ninth, tenth, twelve, fourteenth, sixteenth, eighteenth, nineteenth, twentieth, twenty-second, twenty-fourth, twenty-sixth, twenty-eighth, twenty-ninth, thirty-first, thirty-third, thirty-fifth, and thirty-seventh 26-RUs. In this case, the pilot sequence may also be set as {−1 −1} in the fifth, fourteenth, nineteenth, twenty-fourth, and thirty-third 26-RUs. Alternatively, the pilot sequences may be set as {1 −1}, {1 −1}, {−1 1}, and {−1 1} in the fifth, fourteenth, twenty-fourth, and thirty-third 26-RUs, respectively. Alternatively, the pilot sequences may be set as {−1 1}, {−1 1}, {1 −1}, and {1 −1} in the fifth, fourteenth, twenty-fourth, and thirty-third 26-RUs, respectively. Alternatively, the pilot sequences may be set as {1 −1}, {1 −1}, {1 −1}, and {−1 1} in the fifth, fourteenth, twenty-fourth, and thirty-third 26-RUs, respectively. Alternatively, the pilot sequences may be set as {−1 1}, {1 −1}, {−1 1}, and {1 −1} in the fifth, fourteenth, twenty-fourth, and thirty-third 26-RUs, respectively.

52-RUs (4 Pilots)

The pilot sequence is configured by reusing the pilot sequence {1 1 1 −1} of the existing 802.11ac system in the first, second, fifth, sixth, ninth, tenth, thirteenth, and fourteenth 52-RUs. Furthermore, the pilot sequence is configured by reusing {−1 1 1 1} obtained by changing the order of the pilot sequence of the existing 802.11ac system in the third, fourth, seventh, eighth, eleventh, twelve, fifteenth, and sixteenth 52-RUs.

106-RUs (4 Pilots)

The pilot sequence is configured by reusing the pilot sequence {1 1 1 −1} of the existing 802.11ac system in the first, third, fifth, and seventh 106-RUs. Furthermore, the pilot sequence is configured by reusing {−1 1 1 1} obtained by changing the order of the pilot sequence of the existing 802.11ac system in the second, fourth, sixth, and eighth 106-RUs.

242-RUs (8 Pilots)

The pilot sequence is configured by reusing pilot sequence {1 1 1 −1 −1 1 1 1} of the existing 802.11ac system in the first, second, third, and fourth 242-RUs.

484-RUs (16 Pilots)

The pilot sequence is configured by reusing the pilot sequence {1 1 1 −1 −1 1 1 1 1 1 1 −1 −1 1 1 1} of the existing 802.11ac system in the first and second 484-RUs.

A Full Bandwidth (996-RU, 16 Pilots)

The pilot sequence is set as {1 −1 1 1 1 −1 1 1 1 1 −1 1 1 1 −1 1} in the full bandwidth.

In summary, the pilot sequence of a pilot subcarrier index ±{10 24 38 50 64 78 92 104 118 130 144 158 172 184 198 212 226 238 252 266 280 292 306 320 334 346 360 372 386 400 414 426 440 454 468 480 494} set on the 80 MHz band may be set as {1/−1 1 1 1 −1 1 1 1 −1 1/−1 1/−1 −1 1 1 1 −1 1 1 1 1 1 −1 1 1 1 −1 1/−1 1/−1 −1 1 1 1 −1 1 1 1}. A pilot sequence indicated by "a/b" indicates that the corresponding pilot sequence may be "a" or "b." This may be different depending on a pilot coefficient of the middle 26-RU.

(3)-B) Method for Configuring Pilot Sequence—Option 2

If a predetermined frequency band is 80 MHz and the method of the option 2 is used, a pilot sequence set for each RU is as follows.

26-RUs (2 Pilots)

The pilot sequence is configured by reusing the pilot sequence {1 −1} of the existing 802.11ah system in each 26-RU. If the method of the option 2 is used, a pilot sequence in another RU may be determined based on the 26-RU because the existing method is reused only in the 26-RU. Furthermore, if the method of the option 2 is used, the same pilot sequence can be guaranteed with respect to an RU having the same size.

52-RUs (4 Pilots)

The pilot sequence is set as {1 −1 1 −1} in each 52-RU. In this case, the pilot sequence in the 52-RU has been determined based on the 26-RU in which the pilot sequence {1 −1} of the existing 802.11ah system has been reused.

106-RUs (4 Pilots)

The pilot sequence is set as {1 1 −1 −1} in each 106-RU. In this case, the pilot sequence in the 106-RU has been determined based on the pilot coefficients in the 26-RU and the 106-RU in which the pilot sequence {1 −1} of the existing 802.11ah system has been reused.

242-RUs (8 Pilots)

The pilot sequence is set as {1 1 −1 −1 1 1 −1 −1} in each 242-RU. In this case, the pilot sequence in the 242-RU has been determined based on the pilot coefficients in the 26-RU and 242-RU in which the pilot sequence {1 −1} of the existing 802.11ah system has been reused.

484-RUs (16 Pilots)

The pilot sequence is set as {1 1 −1 −1 1 1 −1 −1 1 1 −1 −1 1 1 −1 −1} in each 484-RU. In this case, the pilot sequence in the 484-RU has been determined based on the pilot coefficients in the 26-RU and 484-RU in which the pilot sequence {1 −1} of the existing 802.11ah system has been reused.

A Full Bandwidth (996-RU, 16 Pilots)

The pilot sequence is set as {1 −1 1 −1 1 −1 1 −1 1 −1 1 −1 1 −1 1 −1} in the full bandwidth. In this case, the pilot sequence in the full bandwidth has been determined based on the pilot coefficients in the 26-RU in which the pilot sequence {1 −1} of the existing 802.11ah system has been reused and the full bandwidth.

In summary, the pilot sequence of a pilot subcarrier index {−494 −480 −468 −454 −440 −426 −414 −400 −386 −372 −360 −346 −334 −320 −306 −292 −280 −266 −252 −238 −226 −212 −198 −184 −172 −158 −144 −130 −118 −104 −92 −78 −64 −50 −38 −24 −10 10 24 38 50 64 78 92 104 118 130 144 158 172 184 198 212 226 238 252 266 280 292 306 320 334 346 360 372 386 400 414 426 440 454 468 480 494} set on the 80 MHz band may be set as {1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1}.

Figure 16:
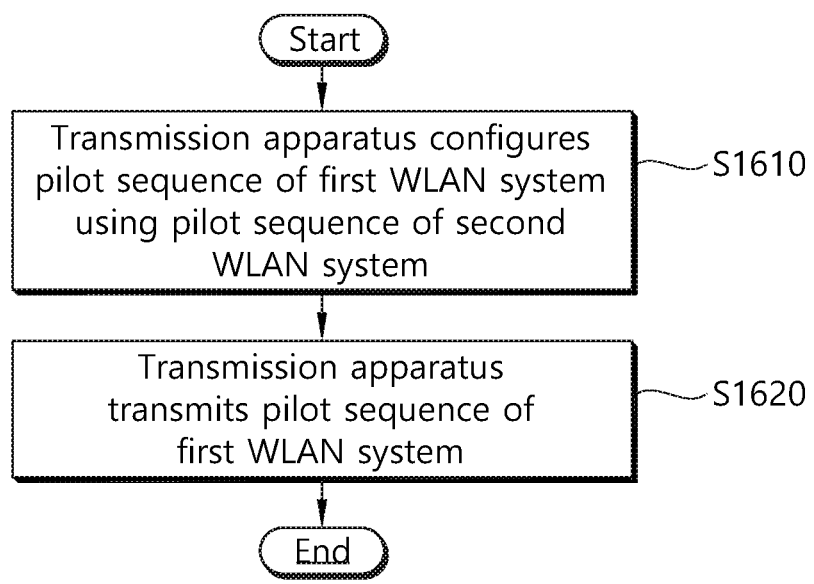
FIG. 16 is a flowchart illustrating a procedure for configuring a pilot sequence according to the present embodiment.

FIG. 16 is a flowchart illustrating a procedure for configuring a pilot sequence according to the present embodiment.

Furthermore, FIG. 16 illustrates a method performed by a first WLAN system supporting a plurality of frequency resource units corresponding to different frequency bands.

First, terms are defined below. The first WLAN system may correspond to an 802.11ax system. A second WLAN system may correspond to an 802.11ac or 802.11ah system. The different frequency bands may correspond to 20 MHz, 40 MHz, 80 MHz, etc. The plurality of frequency resource units corresponding to the different frequency bands may correspond to a 26-RU, a 52-RU, a 106-RU, a 242-RU, a 484-RU and/or a 996-RU. The 26-RU is a frequency RU including 26 subcarriers. The 52-RU is a frequency RU including 52 subcarriers. The 106-RU is a frequency RU including 106 subcarriers. The 242-RU is a frequency RU including 242 subcarriers. The 484-RU is a frequency RU including 484 subcarriers. The 996-RU is a frequency RU including 996 subcarriers.

At step S1610, a transmission apparatus configures the pilot sequence of the first WLAN system using the pilot sequence of the second WLAN system. In this case, the pilot sequence of the second WLAN system may be the pilot sequence {1 −1} of an existing 802.11ah system.

At step S1620, the transmission apparatus transmits the pilot sequence of the first WLAN system.

The pilot sequence of the first WLAN system indicates information about a pilot coefficient corresponding to a predetermined frequency band. Furthermore, the pilot sequence of the first WLAN system is determined with respect to the 52-RU, 106-RU, 242-RU, 484-RU, and 996-RU on the basis of the 26-RU. Furthermore, the pilot sequence of the first WLAN system is identically set for each frequency RU having the same size.

That is, in the method, the pilot sequence is configured by extending the 26-RU to another RU based on the 26-RU by reusing a 1 MHz pilot coefficient of the existing 802.11ah system. In this case, the existing method is reused only in the 26-RU, but the same pilot sequence may be guaranteed in an RU having the same size. That is, the same pilot sequence may be configured for each RU with respect to the same RU.

For example, if the predetermined frequency band is 20 MHz, the pilot sequence of the first WLAN system may be set as {1 −1} in the 26-RU, may be set as {1 −1 1 −1} in the 52-RU, may be set as {1 1 −1 −1} in the 106-RU, and may be set as {1 1 −1 −1 1 1 −1 −1} in the 242-RU.

For another example, if the predetermined frequency band is 40 MHz, the pilot sequence of the first WLAN system may be set as {1 −1} in the 26-RU, may be set as {1 −1 1 −1} in the 52-RU, may be set as {1 1 −1 −1} in the 106-RU, may be set as {1 1 −1 −1 1 1 −1 −1} in the 242-RU, and may be set as {1 1 −1 −1 1 1 −1 −1 1 1 −1 −1 1 1 −1 −1} in the 484-RU.

For yet another example, if the predetermined frequency band is 80 MHz, the pilot sequence of the first WLAN system may be set as {1 −1} in the 26-RU, may be set as {1 −1 1 −1} in the 52-RU, may be set as {1 1 −1 −1} in the 106-RU, may be set as {1 1 −1 −1 1 1 −1 −1} in the 242-RU, may be set as {1 1 −1 −1 1 1 −1 −1 1 1 −1 −1 1 1 −1 −1} in the 484-RU, and may be set as {1 1 1 1 1 1 1 1 1 1 1 1 1 1 1 1} in the 996-RU.

The pilot sequence is not limited to the aforementioned examples and may be set in various manners according to embodiments. The first WLAN system supports a plurality of frequency resource units corresponding to different frequency bands. Accordingly, the pilot sequence may be set in each RU by configuring all of RUs which may be combined within the predetermined frequency band.

Figure 17:
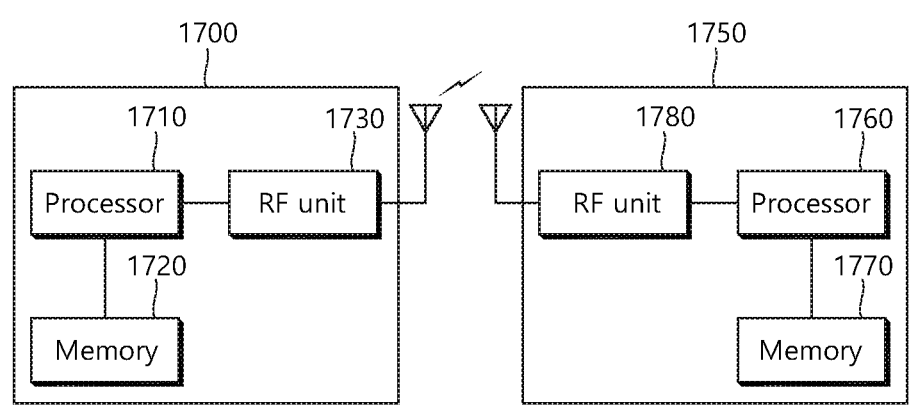
FIG. 17 is a block diagram of a wireless device according to an embodiment of the present invention.

FIG. 17 is a block diagram of a wireless device according to an embodiment of the present invention.

Referring to FIG. 17, as a station (STA) that can realize the above-described exemplary embodiment, the wireless device may correspond to an AP or a non-AP station (non-AP STA). The wireless device may correspond to the above0 described user or may correspond to a transmitting device transmitting a signal to the user.

The AP 1700 includes a processor 1710, a memory 1720, and a radio frequency unit (RF unit) 1730.

The RF unit 1730 is connected to the processor 1710, thereby being capable of transmitting and/or receiving radio signals.

The processor 1710 implements the functions, processes, and/or methods proposed in this specification. For example, the processor 1710 may be realized to perform the operations according to the above-described exemplary embodiments of the present invention. More specifically, the processor 1710 may perform the operations that can be performed by the AP, among the operations that are disclosed in the exemplary embodiments of FIG. 1 to FIG. 16.

The non-AP STA 1750 includes a processor 1760, a memory 1770, and a radio frequency unit (RF unit) 1780.

The RF unit 1780 is connected to the processor 1760, thereby being capable of transmitting and/or receiving radio signals.

The processor 1760 may implement the functions, processes, and/or methods proposed in the exemplary embodiment of the present invention. For example, the processor 1760 may be realized to perform the non-AP STA operations according to the above-described exemplary embodiments of the present invention. The processor may perform the operations of the non-AP STA, which are disclosed in the exemplary embodiments of FIG. 1 to FIG. 16.

The processor 1710 and 1760 may include an application-specific integrated circuit (ASIC), another chip set, a logical circuit, a data processing device, and/or a converter converting a baseband signal and a radio signal to and from one another. The memory 1720 and 1770 may include a read-only memory (ROM), a random access memory (RAM), a flash memory, a memory card, a storage medium, and/or another storage device. The RF unit 1730 and 1780 may include one or more antennas transmitting and/or receiving radio signals.

When the exemplary embodiment is implemented as software, the above-described method may be implemented as a module (process, function, and so on) performing the above-described functions. The module may be stored in the memory 1720 and 1770 and may be executed by the processor 1710 and 1760. The memory 1720 and 1770 may be located inside or outside of the processor 1710 and 1760 and may be connected to the processor 1710 and 1760 through a diversity of well-known means.

What is claimed is:

1. A method for performing communication in a first WLAN system supporting a plurality of frequency resource units (RUs) corresponding to different frequency bands, the method comprising:
    configuring, by a transmission apparatus, a pilot signal configured by a pilot sequence of the first WLAN system for a predetermined frequency band; and
    transmitting, by the transmission apparatus, the pilot signal through the predetermined frequency band,
    wherein a pilot sequence for a 26-RU among the pilot sequence of the first WLAN system is generated by using a pilot sequence of a second WLAN system,
    wherein a pilot sequence for a 52-RU, 106-RU, 242-RU, 484-RU, and 996-RU among the pilot sequence of the first WLAN system is determined based on the pilot sequence for the 26-RU,
    wherein a pilot sequence for a same RU has a same pilot coefficient irrespective of a frequency position within the predetermined frequency band, and
    wherein the 26-RU is a frequency RU comprising 26 subcarriers, the 52-RU is a frequency RU comprising 52 subcarriers, the 106-RU is a frequency RU comprising 106 subcarriers, the 242-RU is a frequency RU comprising 242 subcarriers, the 484-RU is a frequency RU comprising 484 subcarriers, and the 996-RU is a frequency RU comprising 996 subcarriers.

2. The method of claim 1, wherein the pilot sequence for the 26-RU and the pilot sequence of the second WLAN system are set as {1 −1}.

3. The method of claim 2, wherein the predetermined frequency band is 20 MHz, and the pilot sequence of the first WLAN system is set as {1, −1, 1, −1, 1, −1, 1, −1, 1, −1, 1, −1, 1, −1, 1, −1}.

4. The method of claim 2, wherein the predetermined frequency band is 40 MHz, and the pilot sequence of the first WLAN system is set as {1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1}.

5. The method of claim 2, wherein the predetermined frequency band is 80 MHz, and the pilot sequence of the first WLAN system is set as {1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1}.

6. A transmission apparatus performed communication in a first WLAN system supporting a plurality of frequency resource units (RUs) corresponding to different frequency bands, the transmission apparatus comprising:
    a radio frequency (RF) unit transmitting and receiving a radio signal; and
    a processor operatively connected to the RF unit, wherein the processor is configured to:
    configure a pilot signal configured by a pilot sequence of the first WLAN system for a predetermined frequency band, and
    transmit the pilot signal through the predetermined frequency band,
    wherein a pilot sequence for a 26-RU among the pilot sequence of the first WLAN system is generated by using a pilot sequence of a second WLAN system,
    wherein a pilot sequence for a 52-RU, 106-RU, 242-RU, 484-RU, and 996-RU among the pilot sequence of the first WLAN system is determined based on the pilot sequence for the 26-RU,
    wherein a pilot sequence for a same RU has a same pilot coefficient irrespective of a frequency position within the predetermined frequency band, and
    wherein the 26-RU is a frequency RU comprising 26 subcarriers, wherein the 52-RU is a frequency RU comprising 52 subcarriers, wherein the 106-RU is a frequency RU comprising 106 subcarriers, wherein the 242-RU is a frequency RU comprising 242 subcarriers, wherein the 484-RU is a frequency RU comprising 484 subcarriers, and wherein the 996-RU is a frequency RU comprising 996 subcarriers.

7. The transmission apparatus of claim 6, wherein the pilot sequence for the 26-RU and the pilot sequence of the second WLAN system are set as {1 −1}.

8. The transmission apparatus of claim 7, wherein the predetermined frequency band is 20 MHz, and the pilot sequence of the first WLAN system is set as {1, −1, 1, −1, 1, −1, 1, −1, 1, −1, 1, −1, 1, −1, 1, −1}.

9. The transmission apparatus of claim 7, wherein the predetermined frequency band is 40 MHz, and the pilot sequence of the first WLAN system is set as {1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1}.

10. The transmission apparatus of claim 7, wherein the predetermined frequency band is 80 MHz, and the pilot sequence of the first WLAN system is set as {1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1}.

11. The method of claim 2,
    wherein the pilot sequence for the 52-RU is determined based on a pilot sequence for two 26 RUs, and
    wherein the pilot sequence for the 52-RU is set as {1 −1 1 −1}.

12. The method of claim 2,
wherein the pilot sequence for the 106-RU is determined by selecting four pilot coefficients out of a pilot sequence for four 26 RUs, and
wherein the pilot sequence for the 106-RU is set as {1 1 −1 −1}.

13. The method of claim 2,
wherein the pilot sequence for the 242-RU is determined by selecting eight pilot coefficients out of a pilot sequence for eight 26 RUs, and
wherein the pilot sequence for the 242-RU is set as {1 1 −1 −1 1 1 −1 −1}.

14. The method of claim 2,
wherein the pilot sequence for 484-RU is determined by selecting sixteen pilot coefficients out of a pilot sequence for sixteen 26 RUs, and
wherein the pilot sequence for the 484-RU is set as {1 1 −1 −1 1 1 −1 −1 1 1 −1 −1 1 1 −1 −1}.

15. The method of claim 2,
wherein the pilot sequence for 996-RU is determined by selecting sixteen pilot coefficients out of a pilot sequence for thirty-two 26 RUs, and
wherein the pilot sequence for the 996-RU is set as {1 −1 1 −1 1 −1 1 −1 1 −1 1 −1 1 −1 1 −1}.

16. The method of claim 1,
wherein the first WLAN system is 802.11ax system, and
wherein the second WLAN system is 802.11ah system.

\* \* \* \* \*